US010033065B2

(12) United States Patent
Kanno et al.

(10) Patent No.: US 10,033,065 B2
(45) Date of Patent: Jul. 24, 2018

(54) SULFIDE SOLID ELECTROLYTE MATERIAL, BATTERY, AND PRODUCING METHOD FOR SULFIDE SOLID ELECTROLYTE MATERIAL

(71) Applicants: TOKYO INSTITUTE OF TECHNOLOGY, Tokyo (JP); TOYOTA JIDOSHA KABUSHIKI KAISHA, Toyota-shi, Aichi (JP)

(72) Inventors: Ryoji Kanno, Kawasaki (JP); Masaaki Hirayama, Yokohama (JP); Yuki Kato, Susono (JP); Takamasa Otomo, Susono (JP); Mitsuru Sakano, Toyota (JP)

(73) Assignees: TOKYO INSTITUTE OF TECHNOLOGY, Tokyo (JP); TOYOTA JIDOSHA KABUSHIKI KAISHA, Tokyo (JP)

( * ) Notice: Subject to any disclaimer, the term of this patent is extended or adjusted under 35 U.S.C. 154(b) by 654 days.

(21) Appl. No.: 14/375,571

(22) PCT Filed: Feb. 5, 2013

(86) PCT No.: PCT/JP2013/052612
§ 371 (c)(1),
(2) Date: Jul. 30, 2014

(87) PCT Pub. No.: WO2013/118723
PCT Pub. Date: Aug. 15, 2013

(65) Prior Publication Data
US 2015/0037687 A1 Feb. 5, 2015

(30) Foreign Application Priority Data
Feb. 6, 2012 (JP) .................................. 2012-022964
Oct. 23, 2012 (JP) .................................. 2012-234144

(51) Int. Cl.
*H01M 10/05* (2010.01)
*H01M 10/0562* (2010.01)
(Continued)

(52) U.S. Cl.
CPC ......... *H01M 10/0562* (2013.01); *C01B 17/20* (2013.01); *C01B 25/14* (2013.01);
(Continued)

(58) Field of Classification Search
CPC ........... H01M 10/0562; H01M 10/052; H01M 4/623; H01M 2220/20; H01M 2220/30; H01M 2300/0068
See application file for complete search history.

(56) References Cited

U.S. PATENT DOCUMENTS 8,697,292 B2 4/2014 Kanno et al.
2007/0160911 A1 7/2007 Senga et al.
2013/0040208 A1 2/2013 Kanno et al.

FOREIGN PATENT DOCUMENTS

CN 102823049 A 12/2012
JP 2005-228570 A 8/2005
(Continued)

OTHER PUBLICATIONS

Kamaya, Noriaki, "A Lithium Superionic Conductor," Nature Materials, Advanced online publication, Jul. 31, 2011, DOI:10.1038/NMAT3066.
(Continued)

*Primary Examiner* — Jonathan Crepeau
*Assistant Examiner* — Angela Martin
(74) *Attorney, Agent, or Firm* — Oliff PLC

(57) ABSTRACT

A main object of the present invention is to provide a sulfide solid electrolyte material having favorable ion conductivity and low reduction potential. The present invention solves the above-mentioned problem by providing a sulfide solid elec-
(Continued)

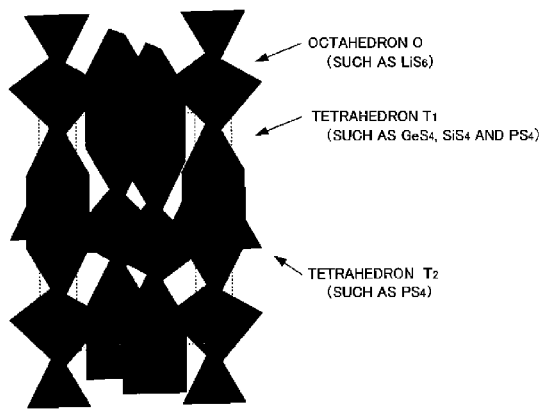

OCTAHEDRON O
(SUCH AS $LiS_6$)

TETRAHEDRON $T_1$
(SUCH AS $GeS_4$, $SiS_4$ AND $PS_4$)

TETRAHEDRON $T_2$
(SUCH AS $PS_4$)

trolyte material including an $M_1$ element (such as a Li element), an $M_2$ element (such as a Ge element, a Si element and a P element) and a S element, wherein the material has a peak at a position of $2\theta=29.58°\pm0.50°$ in X-ray diffraction measurement using a CuKα line; and when a diffraction intensity at the peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50, and $M_2$ contains at least P and Si.

18 Claims, 14 Drawing Sheets

(51) Int. Cl.
| | |
|---|---|
| *H01B 1/10* | (2006.01) |
| *C01B 17/20* | (2006.01) |
| *C01G 19/00* | (2006.01) |
| *C01G 17/00* | (2006.01) |
| *C01B 25/14* | (2006.01) |
| *H01M 10/052* | (2010.01) |
| *H01M 4/62* | (2006.01) |

(52) U.S. Cl.
CPC .......... *C01G 17/006* (2013.01); *C01G 19/006* (2013.01); *H01B 1/10* (2013.01); *H01M 10/052* (2013.01); *C01P 2002/72* (2013.01); *C01P 2002/74* (2013.01); *C01P 2002/77* (2013.01); *C01P 2006/40* (2013.01); *H01M 4/623* (2013.01); *H01M 2220/20* (2013.01); *H01M 2220/30* (2013.01); *H01M 2300/0068* (2013.01)

(56) References Cited

FOREIGN PATENT DOCUMENTS

| | | | |
|---|---|---|---|
| JP | 2008103229 A | 5/2008 | |
| JP | 2010-030889 A | 2/2010 | |
| JP | 2010-036823 A | 2/2010 | |
| JP | 2010-040457 A | 2/2010 | |
| JP | A-2013-33659 | 2/2013 | |
| WO | 2011/118801 A1 | 9/2011 | |
| WO | WO 2011/118801 A1 | 9/2011 | |
| WO | WO 2011118801 | * 9/2011 | ............ C01B 25/14 |

OTHER PUBLICATIONS

Takada, Kazunori, "Lithium Ion Conduction in Lithium Magnesium Thio-Phosphate," Solid State Ionics, vol. 147, (2002), pp. 23-27.
Mar. 9, 2017 Office Action Issued in U.S. Appl. No. 14/760,344.
U.S. Appl. No. 13/636,954, filed Oct. 23, 2012 in the name of Ryoji Kanno et al.
Wordhippo {http://www.wordhippo.com/what- is/ another- word -for/according_to.html} with Wayback Machine Evidence: Feb. 6, 2012.
Kanno, Ryoji, "Electrolytes: Solid Sulfide," Secondary Batteries—Lithium Rechargeable Systems, 2009, pp. 129-137.
Kamaya, N., et al., "A Lithium Superionic Conductor," Nature Materials, vol. 10, 2011, pp. 682-686.
Matsumura, T., "Nickel sulfides as a cathode for all-solid-state ceramic llithium batteries," The Journal of Power Sources, vol. 174, 2007, pp. 632-636.
Inada, T., et al., "All solid-state sheet battery using lithium inorganic solid electrolyte, thio-LISICON," Journal of Power Sources, vol. 194, 2009, pp. 1085-1088.
Murayama, M., et al., "Material design of new lithium conductor, thio-LISICON, in the Li2S—P2S5 system," Solid State Ionics, vol. 170, 2004, pp. 173-180.
Takada, K., "Lithium ion conductive oxysulfide, Li3PO4—Li3PS4," Solid State Ionics, vol. 176, 2005, 2355-2359.
Kanno, R., et al., "Synthesis of a new lithium ionic conductor, thio-LISICON-lithium germanium sulfide system," Solid State Ionics, vol. 130, 2000, pp. 97-104.
Murayama, M., "Synthesis of New Lithium Ionic Conductor Thio-LISICON-Lithium Silicon Sulfides System," Journal of Solid State Chemistry, vol. 168, 2002, pp. 140-148.
Kanno, R., Murayama, M. and Sakamo, K., "New Lithium Solid Electroylytes, Thio-LISICON: Materials Design Concept and Application to Solid State Battery," Solid State Ionics: Trends in the New Millenium, 2002, pp. 13-22.
Leal-Gonzalez, J., Melibary, S., and Smith, A.J., "Structure of Lithium Galllium Sulfide, LiGaS2," Acta Cryst., vol. C46, pp. 2017-2019.
Tae Ahn, Byung and Huggins, Robert, "Synthesis and Lithium Conductivities of Li2SiS3 and Li4SiS4," Mat. Res. Bull., vol. 24, 1989, pp. 889-897.
Tachez, M., "Ionic Conductivity of and Phase Transition in Lithium Thiophosphate Li3PS4," Solid State Ionics, vol. 14, 1984, pp. 181-185.
Mercier R. et al., "Synthese, structure cristalline et anaylse vibrationnnelle de L'hexathiohypodiphosphate de lithium Li4P2S6," Journal of Solid State Chemistry, vol. 43, 1982, pp. 151-162 (with English abstract).
Brie, J.F., et al, "Chimie Minerale—preparation et etude de deux sulfures ternaire de lithium et de phosphore: Li8P2S9 et Li7PS6," C.R. Acad. Sc. Paris, vol. 283, 1996, pp. 581-584 (with English abastract).
Jan. 30, 2017 Restriction Requirement issued in U.S. Appl. No. 14/375,571.
Aug. 7, 2013 Office Action issued in U.S. Appl. No. 13/636,954.
Dec. 12, 2016 Office Action issued in U.S. Appl. No. 14/760,344.
U.S. Appl. No. 14/760,344, filed Jul. 10, 2015 in the name of Ryoji Kanno et al.
Jun. 28, 2011 International Search Report issued in International Patent Application No. PCT/JP2011/057421.
Kanno et al., "Lithium Ionic Conductor Thio-LISICON: The $Li_2S$—$GeS_2$—$P_2S_5$ System," *Journal of Electrochemical Society*, 2001, vol. 148, No. 7, pp. A742-A746.
Kamaya et al., "A Lithium Superionic Conductor," *Nature Materials*, Jul. 31, 2011.
Jul. 6, 2017 Office Action Issued in U.S. Appl. No. 14/760,344.
Oct. 12, 2017 Office Action issued in U.S. Appl. No. 14/760,344.
Dec. 12, 2017 Notice of Allowance issued in U.S. Appl. No. 14/760,344.

* cited by examiner

FIG. 1 UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY
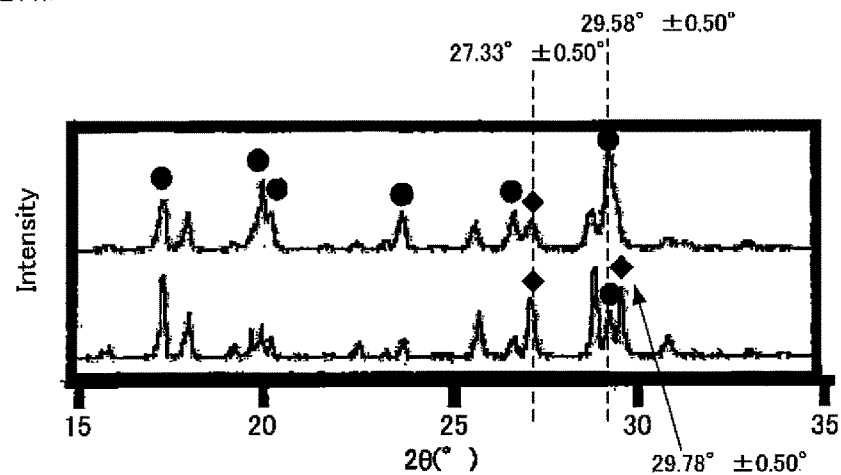
FIG. 2
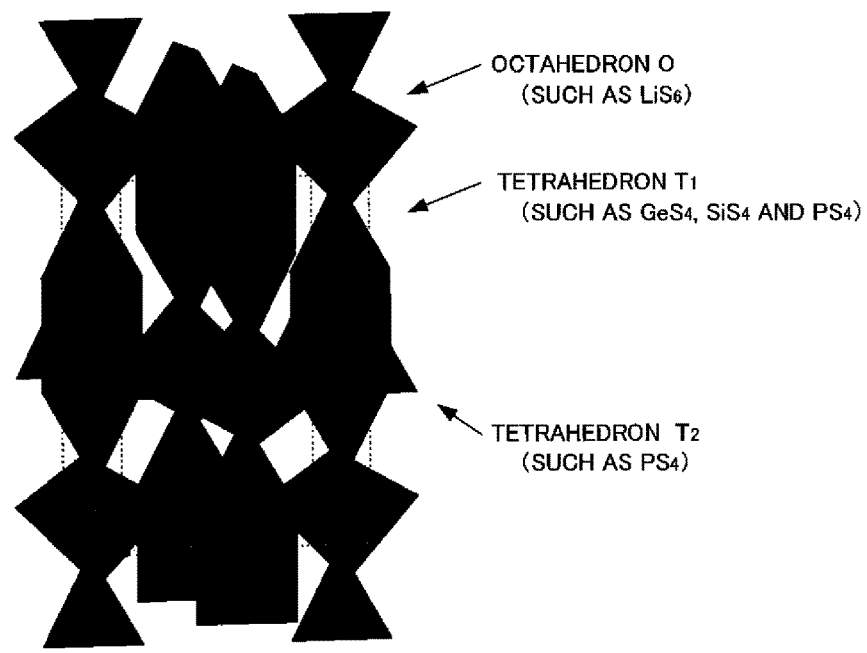

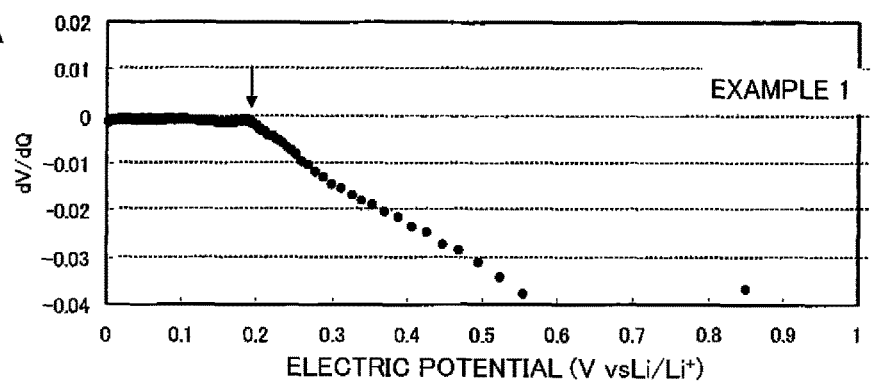
FIG. 11A EXAMPLE 1
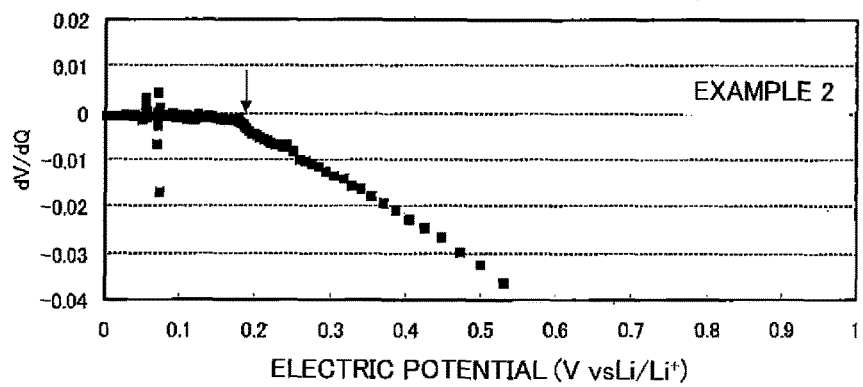
FIG. 11B EXAMPLE 2
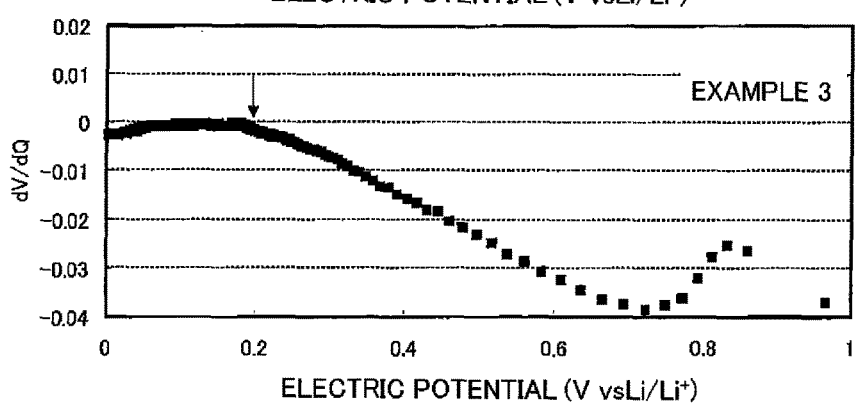
FIG. 11C EXAMPLE 3
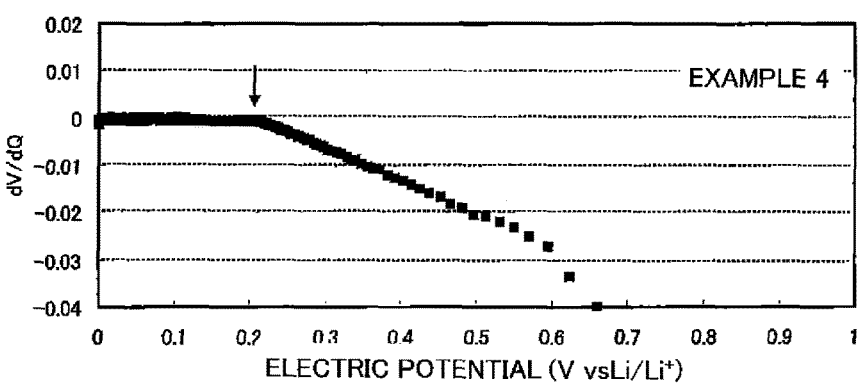
FIG. 11D EXAMPLE 4

FIG. 14A  $Li_{(4-x)}(Ge_{1-\delta}Si_\delta)_{(1-x)}P_xS_4$
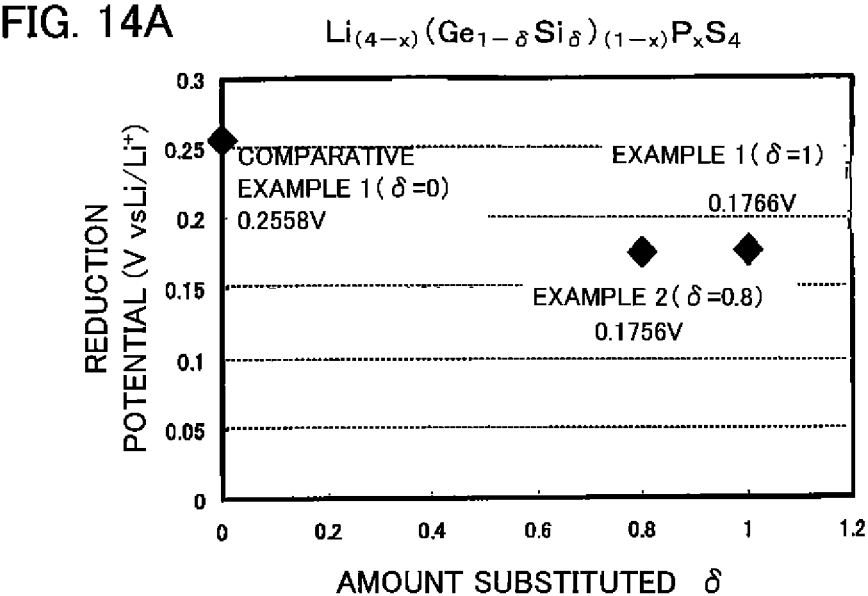
FIG. 14B  $Li_{(4-x)}(Sn_{1-\delta}Si_\delta)_{(1-x)}P_xS_4$
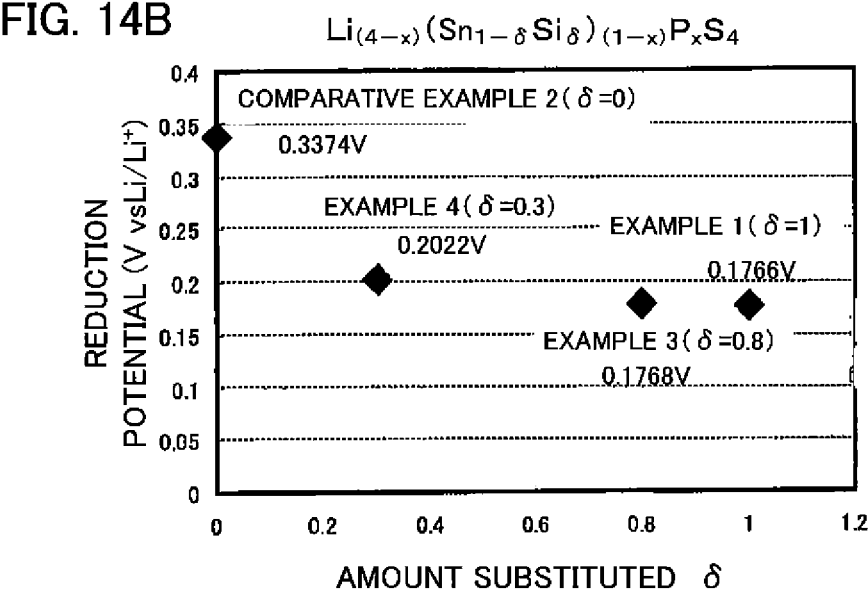

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material having favorable ion conductivity and low reduction potential.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. To the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, a Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material with a high ratio of a crystal phase having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801 A

Non Patent Literature

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)

Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. In Patent Literature 1, it is disclosed that a sulfide solid electrolyte material with a high ratio of a crystal phase having a specific peak in X-ray diffraction measurement has favorable ion conductivity. On the other hand, the problem is that an LiGePS-based sulfide solid electrolyte material described in Patent Literature 1 has a reduction potential of approximately 0.25 V (vs Li/Li$^+$), and is subjected to reductive decomposition and deterioration when used for a battery together with an anode active material having a lower action potential than 0.25 V.

The present invention has been made in view of the above-mentioned problem, and the main object thereof is to provide a sulfide solid electrolyte material having favorable ion conductivity and low reduction potential.

Solution to Problem

In order to solve the above-mentioned problems, the present invention provides a sulfide solid electrolyte material comprising an $M_1$ element, an $M_2$ element and a S element, characterized in that the above-mentioned $M_1$ contains at least Li; and the above-mentioned $M_2$ is at least one kind selected from the group consisting of P, Sb, Si, Ge, Sn, B, Al, Ga, In, Ti, Zr, V and Nb; the material has a peak at a position of $2\theta=29.58°\pm0.50°$ in X-ray diffraction measurement using a CuKα line; when a diffraction intensity at the above-mentioned peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50; and the above-mentioned $M_2$ contains at least P and Si.

According to the present invention, the ratio of a crystal phase having a peak in the vicinity of $2\theta=29.58°$ is so high as to allow the sulfide solid electrolyte material with favorable ion conductivity. In addition, the inclusion of Si allows a sulfide solid electrolyte material having low reduction potential.

Also, the present invention provides a sulfide solid electrolyte material comprising an $M_1$ element, an $M_2$ element and a S element, characterized in that the above-mentioned $M_1$ contains at least Li; the above-mentioned $M_2$ is at least one kind selected from the group consisting of P, Sb, Si, Ge, Sn, B, Al, Ga, In, Ti, Zr, V and Nb; the material has a peak at a position of $2\theta=29.58°\pm0.50°$ in X-ray diffraction measurement using a CuKα line; the material does not have a peak at a position of $2\theta=27.33°\pm0.50°$ in X-ray diffraction measurement using a CuKα line, or when a diffraction intensity at the above-mentioned peak of $2\theta=29.58°\pm0.50°$ is regarded as $I_A$ and a diffraction intensity at the above-mentioned peak of $2\theta=27.33°\pm0.50°$ is regarded as $I_B$ in the case of having a peak at the above-mentioned position of $2\theta=27.33°\pm0.50°$, a value of $I_B/I_A$ is less than 0.50; and the above-mentioned $M_2$ contains at least P and Si.

According to the present invention, the ratio of a crystal phase having a peak in the vicinity of $2\theta=29.58°$ is so high as to allow the sulfide solid electrolyte material with favorable ion conductivity. In addition, the inclusion of Si allows a sulfide solid electrolyte material having low reduction potential.

In the above-mentioned invention, the above-mentioned $M_2$ preferably contains an element other than P and Si.

In the above-mentioned invention, the molar fraction of Si to the above-mentioned $M_2$ excluding P is preferably 30% or more.

In the above-mentioned invention, in a crystal phase having a peak at the above-mentioned position of $2\theta=29.58°\pm0.50°$, the a-axial length of a lattice constant is preferably 8.69 Å or less.

In the above-mentioned invention, in the case where the total of the molar fraction of the above-mentioned $M_2$ is regarded as 1, the molar fraction of the above-mentioned $M_1$ is preferably 3.35 or more.

Also, the present invention provides a sulfide solid electrolyte material having an octahedron O composed of an $M_1$ element and a S element, a tetrahedron $T_1$ composed of an $M_{2a}$ element and a S element, and a tetrahedron $T_2$ composed of an $M_{2b}$ element and a S element, characterized in that the above-mentioned tetrahedron $T_1$ and the above-mentioned octahedron O share an edge, the above-mentioned tetrahedron $T_2$ and the above-mentioned octahedron O contain a crystal structure sharing a corner as the main body, the above-mentioned $M_1$ contains at least Li, the above-mentioned $M_{2a}$ and the above-mentioned $M_{2b}$ are each independently at least one kind selected from the group consisting of P, Sb, Si, Ge, Sn, B, Al, Ga, In, Ti, Zr, V and Nb, at least one of the above-mentioned $M_{2a}$ and the above-mentioned $M_{2b}$ contains P, and at least one of the above-mentioned $M_{2a}$ and the above-mentioned $M_{2b}$ contains Si.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the inclusion of Si allows a sulfide solid electrolyte material having low reduction potential.

In the above-mentioned invention, at least one of the above-mentioned $M_{2a}$ and the above-mentioned $M_{2b}$ preferably contains an element other than P and Si.

In the above-mentioned invention, the molar fraction of Si to the above-mentioned $M_{2a}$ and the above-mentioned $M_{2b}$ which are excluding P is preferably 30% or more.

In the above-mentioned invention, in the above-mentioned crystal structure, the a-axial length of a lattice constant is preferably 8.69 Å or less.

In the above-mentioned invention, in the case where the total of the molar fraction of the above-mentioned $M_{2a}$ and the above-mentioned $M_{2b}$ is regarded as 1, the molar fraction of the above-mentioned $M_1$ is preferably 3.35 or more.

Also, the present invention provides a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer and the above-mentioned electrolyte layer contains the above-mentioned sulfide solid electrolyte material.

According to the present invention, the use of the above-mentioned sulfide solid electrolyte material allows the high-output battery.

Also, the present invention provides a producing method for a sulfide solid electrolyte material, the sulfide solid electrolyte material being the sulfide solid electrolyte material having the above-mentioned peak intensity ratio, comprising steps of: an ion conductive material synthesizing step of synthesizing an amorphized ion conductive material by mechanical milling while using a raw material composition containing the above-mentioned $M_1$ element, the above-mentioned $M_2$ element and the above-mentioned S element, and a heating step of obtaining the above-mentioned sulfide solid electrolyte material by heating the above-mentioned amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of Si allows a sulfide solid electrolyte material having low reduction potential.

Also, the present invention provides a producing method for a sulfide solid electrolyte material, the sulfide solid electrolyte material being the sulfide solid electrolyte material having the above-mentioned crystal structure, comprising steps of: an ion conductive material synthesizing step of synthesizing an amorphized ion conductive material by mechanical milling while using a raw material composition containing the above-mentioned $M_1$ element, the above-mentioned $M_{2a}$ element, the above-mentioned $M_{2b}$ element and the above-mentioned S element, and a heating step of obtaining the above-mentioned sulfide solid electrolyte material by heating the above-mentioned amorphized ion conductive material.

According to the present invention, amorphization is performed in the ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of Si allows a sulfide solid electrolyte material having low reduction potential.

Advantageous Effects of Invention

The present invention produces the effect such as to allow a sulfide solid electrolyte material having favorable ion conductivity and low reduction potential.

BRIEF DESCRIPTION OF DRAWINGS

FIG. 1 is an X-ray diffraction spectrum explaining a difference between a sulfide solid electrolyte material with high ion conductivity and a sulfide solid electrolyte material with low ion conductivity.

FIG. 2 is a perspective view explaining an example of a crystal structure of a sulfide solid electrolyte material of the present invention.

FIGS. 11A to 11D are graphs showing relations between electric potential and dV/dQ in evaluation batteries using sulfide solid electrolyte materials obtained in Examples 1 to 4.

FIGS. 14A and 14B are reduction potentials of sulfide solid electrolyte materials obtained in Examples 1 to 4 and Comparative Examples 1 and 2.

DESCRIPTION OF EMBODIMENTS

Figure 3:
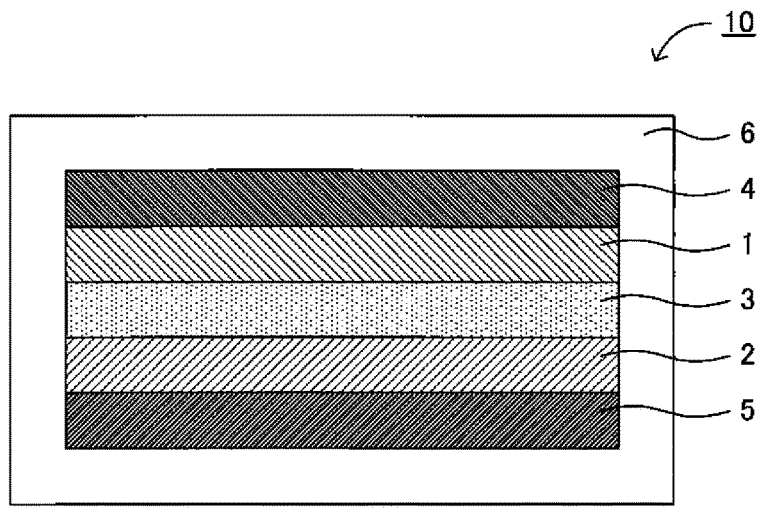
FIG. 3 is a schematic cross-sectional view showing an example of a battery of the present invention.

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

A sulfide solid electrolyte material of a first embodiment comprises an $M_1$ element, an $M_2$ element and a S element, characterized in that the above-mentioned $M_1$ contains at least Li; and the above-mentioned $M_2$ is at least one kind selected from the group consisting of P, Sb, Si, Ge, Sn, B, Al, Ga, In, Ti, Zr, V and Nb; the material has a peak at a position of $2\theta=29.58°\pm0.50°$ in X-ray diffraction measurement using a CuKα line; when a diffraction intensity at the above-mentioned peak of $2\theta=29.58°\pm0.50°$ is regarded as $I_A$ and a diffraction intensity at a peak of $2\theta=27.33°\pm0.50°$ is regarded as $I_B$, a value of $I_B/I_A$ is less than 0.50; and the above-mentioned $M_2$ contains at least P and Si.

According to the first embodiment, the ratio of a crystal phase having a peak in the vicinity of $2\theta=29.58°$ is so high as to allow the sulfide solid electrolyte material with favorable ion conductivity. In addition, the inclusion of Si allows a sulfide solid electrolyte material having low reduction potential. Si is small in ionic radius and makes a firm bond to S, so as to be conceived to have the property of being reduced with difficulty; consequently, it is assumed that reduction potential lowers. Also, in comparison of alloying potential with Li, Si is around 0.35 V (Li/Li+), which is so lower than Ge (around 0.4 V) and Sn (around 0.6 V) as to be alloyed with Li with difficulty; consequently, it is assumed that reduction potential lowers.

FIG. 1 is an X-ray diffraction spectrum explaining a difference between a sulfide solid electrolyte material with high ion conductivity and a sulfide solid electrolyte material with low ion conductivity. Incidentally, both of the two sulfide solid electrolyte materials in FIG. 1 have a composition of $Li_{3.25}Ge_{0.25}P_{0.75}S_4$. In FIG. 1, the sulfide solid electrolyte material with high ion conductivity has a peak at a position of $2\theta=29.58°\pm0.50°$ and a position of $2\theta=27.33°\pm0.50°$. Also, in FIG. 1, the sulfide solid electrolyte material with low ion conductivity has the same peak. Here, it is conceived that a crystal phase having a peak in the vicinity of $2\theta=29.58°$ and a crystal phase having a peak in the vicinity of $2\theta=27.33°$ are crystal phases different from each other. Incidentally, in the first embodiment, the crystal phase having a peak in the vicinity of $2\theta=29.58°$ and the crystal phase having a peak in the vicinity of $2\theta=27.33°$ are occasionally referred to as "crystal phase A" and "crystal phase B", respectively. The crystal structure of this crystal phase A is conceived to be the crystal structure described in the after-mentioned second embodiment.

Both of the crystal phases A and B are crystal phases exhibiting ion conductivity, which is different. The crystal phase A is conceived to be remarkably high in ion conductivity as compared with the crystal phase B. A conventional synthesis method (such as a solid-phase method) has not been capable of decreasing the ratio of the crystal phase B with low ion conductivity, and has not been capable of sufficiently heightening ion conductivity. To the contrary, in the first embodiment, the crystal phase A with high ion conductivity may be precipitated so positively as to allow the sulfide solid electrolyte material with high ion conductivity.

Also, in the first embodiment, in order to distinguish from the sulfide solid electrolyte material with low ion conductivity, a diffraction intensity at a peak in the vicinity of $2\theta=29.58°$ is regarded as $I_A$ and a diffraction intensity at a peak in the vicinity of $2\theta=27.33°$ is regarded as $I_B$, and a value of $I_B/I_A$ is prescribed at less than 0.50. Incidentally, it is conceived that a conventional synthesis method has not allowed the sulfide solid electrolyte material such that a value of $I_B/I_A$ is less than 0.50. Also, from the viewpoint of ion conductivity, the sulfide solid electrolyte material of the first embodiment is preferably high in the ratio of the crystal phase A with high ion conductivity. Thus, a value of $I_B/I_A$ is preferably smaller; specifically, preferably 0.45 or less, more preferably 0.25 or less, far more preferably 0.15 or less, and particularly preferably 0.07 or less. Also, a value of $I_B/I_A$ is preferably 0. In other words, it is preferable that the sulfide solid electrolyte material of the first embodiment does not have a peak in the vicinity of $2\theta=27.33°$ as a peak of the crystal phase B.

The sulfide solid electrolyte material of the first embodiment has a peak in the vicinity of $2\theta=29.58°$. This peak is one of the peaks of the crystal phase A with high ion conductivity, as described above. Here, $2\theta=29.58°$ is an actual measurement value, and a crystal lattice changes somewhat due to material composition and the like, so that a position of the peak occasionally shifts somewhat from $2\theta=29.58°$. Thus, in the first embodiment, the above-mentioned peak of the crystal phase A is defined as a peak at a position of $2\theta=29.58°\pm0.50°$. The crystal phase A is ordinarily conceived to have peaks of $2\theta=17.38°$, $20.18°$, 20.44°, 23.56°, 23.96°, 24.93°, 26.96°, 29.07°, 29.58°, 31.71°, 32.66° and 33.39°. Incidentally, also these peak positions occasionally shift in a range of ±0.50°.

On the other hand, the peak in the vicinity of 2θ=27.33° is one of the peaks of the crystal phase B with low ion conductivity, as described above. Here, 2θ=27.33° is an actual measurement value, and a crystal lattice changes somewhat due to material composition and the like, so that a position of the peak occasionally shifts somewhat from 2θ=27.33°. Thus, in the first embodiment, the above-mentioned peak of the crystal phase B is defined as a peak at a position of 2θ=27.33°±0.50°. The crystal phase B is ordinarily conceived to have peaks of 2θ=17.46°, 18.12°, 19.99°, 22.73°, 25.72°, 27.33°, 29.16° and 29.78°. Incidentally, also these peak positions occasionally shift in a range of ±0.50°.

Also, the sulfide solid electrolyte material of the first embodiment contains an $M_1$ element, an $M_2$ element and a S element. The above-mentioned $M_1$ is not particularly limited if the $M_1$ contains at least Li, but may be only Li or a combination of Li and another element. Another element is, for example, preferably a monovalent or divalent element, specifically, preferably at least one kind selected from the group consisting of Na, K, Mg, Ca and Zn. Also, the above-mentioned $M_1$ may be a monovalent element (such as Li, Na and K), which is partially substituted with a divalent or more element (such as Mg, Ca and Zn). Thus, a monovalent element moves so easily as to improve ion conductivity.

On the other hand, the above-mentioned $M_2$ is preferably a trivalent, tetravalent or pentavalent element, and contains at least a tetravalent element more preferably. Also, the above-mentioned $M_2$ is ordinarily at least one kind selected from the group consisting of P, Sb, Si, Ge, Sn, B, Al, Ga, In, Ti, Zr, V and Nb. The first embodiment is greatly characterized in that the above-mentioned $M_2$ contains at least P and Si. The above-mentioned $M_2$ may (i) be only P and Si or (ii) further contain an element other than P and Si. In the case of (ii), another element $M_{2x}$ is ordinarily at least one kind selected from the group consisting of Sb, Ge, Sn, B, Al, Ga, In, Ti, Zr, V and Nb, and preferably at least one kind selected from the group consisting of Ge, Sn, Al, Ga and B. It may be grasped that the above-mentioned case of (ii) is an aspect such that part of the $M_{2x}$ element is substituted with a Si element.

Also, in the first embodiment, the molar fraction of Si to $M_2$ excluding P is ordinarily larger than 0. Here, "$M_2$ excluding P" specifically means the following. That is to say, in the case where $M_2$ is only P and Si like the above-mentioned (i), "$M_2$ excluding P" represents Si; in the case where $M_2$ contains $M_{2x}$ in addition to P and Si like the above-mentioned (ii), "$M_2$ excluding P" represents Si and $M_{2x}$. The above-mentioned molar fraction of Si is, for example, 10 mol % or more, preferably 30 mol % or more. Incidentally, the case where the molar fraction of Si is 100% corresponds to the above-mentioned case of (i). On the other hand, in the above-mentioned case of (ii), the molar fraction of Si is preferably 99% or less, for example. Also, the above-mentioned case of (ii) is advantageous in Li ion conductance as compared with the above-mentioned case of (i), for example.

Also, the sulfide solid electrolyte material of the first embodiment preferably contains an O element. The reason therefor is that ion conductivity is further improved. The ratio of O element contained in the sulfide solid electrolyte material is preferably a ratio such as to allow higher ion conductivity than ion conductivity of the same sulfide solid electrolyte material except for adjusting valence number with S without containing an O element (a sulfide solid electrolyte material not containing an O element). Incidentally, the sulfide solid electrolyte material not containing an O element corresponds to $Li_{3.35}(Ge_{1-\delta}Si_\delta)_{0.35}P_{0.65}S_4$ in the case where the sulfide solid electrolyte material containing an O element is $Li_{3.35}(Ge_{1-\delta}Si_\delta)_{0.35}P_{0.65}(S_{1-y}O_y)_4$, for example. Here, the ratio of the O element to the total of the S element and the O element is, for example, preferably 0.1% or more, more preferably 0.5% or more, and far more preferably 1% or more. On the other hand, the above-mentioned ratio of O element is, for example, preferably 25% or less. The reason therefor is to allow the sulfide solid electrolyte material having higher ion conductivity. Also, the above-mentioned ratio of O element may be determined by XPS and EDX, for example.

Also, in the after-mentioned examples, LiGeSiPS-based, LiSnSiPS-based and LiSiPSO-based sulfide solid electrolyte materials are really synthesized and X-ray diffraction measurement of an obtained sample is performed to confirm that $I_B/I_A$ is a predetermined value or less. On the other hand, the sulfide solid electrolyte material of the first embodiment ordinarily has a predetermined crystal structure described in the after-mentioned second embodiment. It is guessed that an optional combination of an $M_1$ element and an $M_2$ element may offer the same crystal structure as the above-mentioned sulfide solid electrolyte material. Thus, it is conceived that any optional combination of an $M_1$ element and an $M_2$ element allows the sulfide solid electrolyte material with favorable ion conductivity. Also, a position of a peak in X-ray diffraction depends on a crystal structure, so that it is conceived that a similar XRD pattern is obtained irrespective of kinds of an $M_1$ element and an $M_2$ element if the sulfide solid electrolyte material has the above-mentioned crystal structure.

Also, the sulfide solid electrolyte material of the first embodiment preferably contains a Li element, a Ge element, a Si element, a P element and a S element. In addition, the composition of the LiGeSiPS-based sulfide solid electrolyte material is not particularly limited if the composition is a composition such as to allow a predetermined value of $I_B/I_A$, but is preferably $Li_{(4-x)}(Ge_{1-\delta}Si_\delta)_{(1-x)}P_x(S_{1-y}O_y)_4$ ("x" satisfies 0<x<1, "y" satisfies 0≤y≤0.25 and "δ" satisfies 0<δ<1). The reason therefor is to allow the sulfide solid electrolyte material with high ion conductivity. Here, a composition of $Li_{(4-x)}Ge_{(1-x)}P_xS_4$ not having a Si element and an O element corresponds to a composition of a solid solution of $Li_3PS_4$ and $Li_4GeS_4$. That is to say, this composition corresponds to a composition on a tie line of $Li_3PS_4$ and $Li_4GeS_4$. Both $Li_3PS_4$ and $Li_4GeS_4$ correspond to an ortho-composition and have the advantage that chemical stability is high.

Also, "x" in $Li_{(4-x)}(Ge_{1-\delta}Si_\delta)_{(1-x)}P_x(S_{1-y}O_y)_4$ is not particularly limited if the "x" is a value such as to allow a predetermined value of $I_B/I_A$, but satisfies preferably 0.4≤x, more preferably 0.5≤x, and far more preferably 0.6≤x, for example. On the other hand, the above-mentioned "x" satisfies preferably x≤0.8, more preferably x≤0.75. The reason therefor is that such a range of "x" allows a value of $I_B/I_A$ to be further decreased. Thus, the sulfide solid electrolyte material with further favorable ion conductivity may be obtained. Incidentally, in the above-mentioned formula, a tetravalent $M_{2x}$ element other than a Si element may be used instead of a Ge element. Similarly, the reason therefor is to allow a sulfide solid electrolyte material having high chemical stability.

The sulfide solid electrolyte material of the first embodiment is ordinarily lower in reduction potential than the same sulfide solid electrolyte material except for adjusting valence number with the $M_{2x}$ element without containing a Si element (a sulfide solid electrolyte material not containing a Si element). Incidentally, the sulfide solid electrolyte material not containing a Si element corresponds to $Li_{3.35}Ge_{0.35}P_{0.65}S_4$ in the case where the sulfide solid electrolyte material containing a Si element is $Li_{3.35}(Ge_{1-\delta}Si_\delta)_{0.35}P_{0.65}S_4$, for example. The reduction potential of the sulfide solid electrolyte material containing a Si element (the sulfide solid electrolyte material of the first embodiment) is preferably lower by 0.01 V (vs $Li/Li^+$) or more, more preferably lower by 0.02 V (vs $Li/Li^+$) or more than the reduction potential of the sulfide solid electrolyte material not containing a Si element. Also, the sulfide solid electrolyte material of the first embodiment is, for example, preferably 0.3 V (vs $Li/Li^+$) or less, and more preferably 0.25 V (vs $Li/Li^+$) or less.

In the first embodiment, a lattice constant of the crystal phase A (the crystal phase having a peak at a position of $2\theta=29.58°\pm0.50°$) is not particularly limited. Above all, the a-axial length of a lattice constant of the crystal phase A is, for example, preferably 8.69 Å or less, more preferably 8.68 Å or less, and far more preferably 8.67 Å or less. The reason therefor is to allow a sulfide solid electrolyte material having lower reduction potential. The reason why reduction potential becomes lower is conceived to be that a smaller lattice constant brings a shorter metal-sulfur distance to cause the bond to be cut with difficulty. On the other hand, the a-axial length of a lattice constant is ordinarily 8.0 Å or more. The lattice constant may be measured by performing Rietveld analysis on the basis of the data of XRD pattern.

Also, the sulfide solid electrolyte material of the first embodiment contains the $M_1$ element, the $M_2$ element and the S element. With the total of the molar fraction of $M_2$ being regarded as 1, the molar fraction of $M_1$ is determined at $M_1$ amount. For example, in the case where the sulfide solid electrolyte material has a composition of $Li_{3.4}(Ge_{0.2}Si_{0.8})_{0.4}P_{0.6}S_4$, $M_1$ amount (Li amount) becomes $3.4/(0.4+0.6)=3.4$. The value of $M_1$ amount is not particularly limited but is, for example, preferably 3.35 or more, and more preferably 3.38 or more. The reason therefor is to allow a sulfide solid electrolyte material having lower reduction potential. The reason therefor is conceived to be as follows. That is to say, it is conceived that the reductive decomposition of the sulfide solid electrolyte material is caused in such a manner that the sulfide solid electrolyte material receives both Li and electrons. Thus, it is conceived that a larger $M_1$ amount and fewer interstitial sites (empty sites) cause $M_1$ to intrude into the crystal with difficulty and cause the sulfide solid electrolyte material to be subjected to reductive decomposition with difficulty. On the other hand, the value of $M_1$ amount is, for example, 4.5 or less, and preferably 4.0 or less. The reason therefor is that too large $M_1$ amount brings a possibility that the crystal phase A is not precipitated.

The sulfide solid electrolyte material of the first embodiment is ordinarily a crystalline sulfide solid electrolyte material. Also, the sulfide solid electrolyte material of the first embodiment is preferably high in ion conductivity, and ion conductivity of the sulfide solid electrolyte material at 25° C. is preferably $1.0\times10^{-3}$ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for the sulfide solid electrolyte material of the first embodiment is described in detail in the after-mentioned "C. Producing method for sulfide solid electrolyte material". Also, the sulfide solid electrolyte material of the first embodiment may have characteristics of the after-mentioned second embodiment together.

Incidentally, the first embodiment can provide a sulfide solid electrolyte material comprising an $M_1$ element, an $M_2$ element and a S element, characterized in that the above-mentioned $M_1$ contains at least Li; the above-mentioned $M_2$ is at least one kind selected from the group consisting of P, Sb, Si, Ge, Sn, B, Al, Ga, In, Ti, Zr, V and Nb; and having a peak at a position of $2\theta=29.58°\pm0.50°$ in X-ray diffraction measurement using a CuKα line; the material does not have a peak at a position of $2\theta=27.33°\pm0.50°$ in X-ray diffraction measurement using a CuKα line, or when a diffraction intensity at the above-mentioned peak of $2\theta=29.58°\pm0.50°$ is regarded as $I_A$ and a diffraction intensity at the above-mentioned peak of $2\theta=27.33°\pm0.50°$ is regarded as $I_B$ in the case of having a peak at the above-mentioned position of $2\theta=27.33°\pm0.50°$, a value of $I_B/I_A$ is less than 0.50, and the above-mentioned $M_2$ contains at least P and Si. It is obvious from the above-mentioned description that the sulfide solid electrolyte material of the first embodiment includes the case of not having a peak in the vicinity of $2\theta=27.33°$ as a peak of the crystal phase B; this expression allows the case of not having a peak in the vicinity of $2\theta=27.33°$ to be prescribed further definitely.

2. Second Embodiment

Next, a second embodiment of a sulfide solid electrolyte material of the present invention is described. The sulfide solid electrolyte material of the second embodiment has an octahedron O composed of an $M_1$ element and a S element, a tetrahedron $T_1$ composed of an $M_{2a}$ element and a S element, and a tetrahedron $T_2$ composed of an $M_{2b}$ element and a S element, characterized in that the above-mentioned tetrahedron $T_1$ and the above-mentioned octahedron O share an edge, the above-mentioned tetrahedron $T_2$ and the above-mentioned octahedron O contain a crystal structure sharing a corner as the main body, the above-mentioned $M_1$ contains at least Li, the above-mentioned $M_{2a}$ and the above-mentioned $M_{2b}$ are each independently at least one kind selected from the group consisting of P, Sb, Si, Ge, Sn, B, Al, Ga, In, Ti, Zr, V and Nb, at least one of the above-mentioned $M_{2a}$ and the above-mentioned $M_{2b}$ contains P, and at least one of the above-mentioned $M_{2a}$ and the above-mentioned $M_{2b}$ contains Si.

According to the second embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the inclusion of Si allows a sulfide solid electrolyte material having low reduction potential.

FIG. 2 is a perspective view explaining an example of a crystal structure of the sulfide solid electrolyte material of the second embodiment. In the crystal structure shown in FIG. 2, the octahedron O has $M_1$ as the central element, and has six pieces of S at the corner of the octahedron; typically, $LiS_6$ octahedron. The tetrahedron $T_1$ has $M_{2a}$ as the central element, and has four pieces of S at the corner of the tetrahedron; typically, $GeS_4$ tetrahedron, $SiS_4$ tetrahedron and $PS_4$ tetrahedron. The tetrahedron $T_2$ has $M_{2b}$ as the central element, and has four pieces of S at the corner of the tetrahedron; typically, $PS_4$ tetrahedron. In addition, the tetrahedron $T_1$ and the octahedron O share an edge, and the tetrahedron $T_2$ and the octahedron O share a corner.

At least one of the above-mentioned $M_{2a}$ and the above-mentioned $M_{2b}$ ordinarily contains P. That is to say, either the above-mentioned $M_{2a}$ or the above-mentioned $M_{2b}$ may contain P; both the above-mentioned $M_{2a}$ and the above-mentioned $M_{2b}$ may contain P. Also, at least one of the above-mentioned $M_{2a}$ and the above-mentioned $M_{2b}$ ordinarily contains Si. That is to say, either the above-mentioned $M_{2a}$ or the above-mentioned $M_{2b}$ may contain Si; both the above-mentioned $M_{2a}$ and the above-mentioned $M_{2b}$ may contain Si. Also, at least one of the above-mentioned $M_{2a}$ and the above-mentioned $M_{2b}$ may contain $M_{2x}$. That is to say, either the above-mentioned $M_{2a}$ or the above-mentioned $M_{2b}$ may contain $M_{2x}$; both the above-mentioned $M_{2a}$ and the above-mentioned $M_{2b}$ may contain $M_{2x}$. Also, in the second embodiment, the molar fraction of Si to $M_{2a}$ and $M_{2b}$ which are excluding P is ordinarily larger than 0. Also, "$M_{2a}$ and $M_{2b}$ which are excluding P" is basically the same as the contents described in the first embodiment. Also, a preferable range of the above-mentioned molar fraction of Si is the same as the contents described in the first embodiment; therefore, the description here is omitted.

The sulfide solid electrolyte material of the second embodiment is greatly characterized by including the above-mentioned crystal structure as the main body. The ratio of the above-mentioned crystal structure in the whole crystal structure of the sulfide solid electrolyte material is not particularly limited but is preferably higher. The reason therefor is to allow the sulfide solid electrolyte material with high ion conductivity. The ratio of the above-mentioned crystal structure is, specifically, preferably 70 wt % or more, more preferably 90 wt % or more. Incidentally, the ratio of the above-mentioned crystal structure may be measured by radiated light XRD, for example. In particular, the sulfide solid electrolyte material of the second embodiment is preferably a single-phase material of the above-mentioned crystal structure. The reason therefor is to allow ion conductivity to be extremely heightened.

Also, at least one of the above-mentioned octahedron O, tetrahedron $T_1$ and tetrahedron $T_2$ may be such that part of the S element is substituted with O element. Incidentally, it may be confirmed by XRD pattern analysis and neutron diffraction through Rietveld method that part of the S element is substituted with O element.

Incidentally, the $M_1$ element, the $M_2$ element (the $M_{2a}$ element and the $M_{2b}$ element), and other items in the second embodiment are the same as the above-mentioned first embodiment; therefore, the description here is omitted.

B. Battery

Next, a battery of the present invention is described. The battery of the present invention is a battery comprising a cathode active material layer containing a cathode active material, an anode active material layer containing an anode active material, and an electrolyte layer formed between the above-mentioned cathode active material layer and the above-mentioned anode active material layer, characterized in that at least one of the above-mentioned cathode active material layer, the above-mentioned anode active material layer and the above-mentioned electrolyte layer contains the above-mentioned sulfide solid electrolyte material.

According to the present invention, the use of the above-mentioned sulfide solid electrolyte material allows the high-output battery.

FIG. 3 is a schematic cross-sectional view showing an example of the battery of the present invention. A battery 10 shown in FIG. 3 has a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in the above-mentioned "A. Sulfide solid electrolyte material". Above all, in the present invention, the above-mentioned sulfide solid electrolyte material contained in the anode active material layer 2 or the electrolyte layer 3 preferably contacts with an anode active material. The reason therefor is that the above-mentioned sulfide solid electrolyte material is so low in reduction potential as to have the advantages that the range of selections of usable anode active materials extends and the use of an anode active material with low action potential increases battery voltage as compared with the case of using the sulfide solid electrolyte material not containing Si.

The battery of the present invention is hereinafter described for each constitution.

1. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the above-mentioned sulfide solid electrolyte material. The reason therefor is that the above-mentioned sulfide solid electrolyte material is so low in reduction potential that the range of selections of usable anode active materials extends as compared with the case of using the sulfide solid electrolyte material not containing Si. The ratio of the above-mentioned sulfide solid electrolyte material contained in the anode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. In particular, in the present invention, it is preferable that the anode active material layer contains the above-mentioned sulfide solid electrolyte material and action potential of an anode active material (electric potential at which insertion reaction of Li ions is produced) is higher than reduction potential of the above-mentioned sulfide solid electrolyte material.

The anode active material layer may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polyvinylidene fluoride (PVDF). Also, the thickness of the anode active material layer is preferably within a range of 0.1 µm to 1000 µm, for example.

2. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the above-mentioned sulfide solid electrolyte material. The ratio of the above-mentioned sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 µm to 1000 µm, for example, and within a range of 0.1 µm to 300 µm, above all. Also, examples of a method for forming a solid electrolyte layer include a method for compression-molding a solid electrolyte material.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the above-mentioned sulfide solid electrolyte material. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the above-mentioned organic solvent include ethylene carbonate (EC), propylene carbonate (PC), dimethyl carbonate (DMC), diethyl carbonate (DEC), ethylmethyl carbonate (EMC) and butylene carbonate (BC).

3. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the above-mentioned sulfide solid electrolyte material. The ratio of the above-mentioned sulfide solid electrolyte material contained in the cathode active material layer varies with kinds of a battery and is preferably, for example, within a range of 0.1% by volume to 80% by volume, above all, within a range of 1% by volume to 60% by volume, and particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Incidentally, a conductive material and a binder used for the cathode active material layer are the same as the case of the above-mentioned anode active material layer. Also, the thickness of the cathode active material layer is preferably within a range of 0.1 µm to 1000 µm, for example.

4. Other Constitutions

The battery of the present invention comprises at least the above-mentioned anode active material layer, electrolyte layer and cathode active material layer, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the above-mentioned battery, but the same method as a producing method for a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described. The producing method for a sulfide solid electrolyte material of the present invention may be roughly divided into two embodiments. Then, the producing method for a sulfide solid electrolyte material of the present invention is described while divided into a first embodiment and a second embodiment.

1. First Embodiment

The producing method for the sulfide solid electrolyte material of the first embodiment is a producing method for the sulfide solid electrolyte material described in "A. Sulfide solid electrolyte material 1. First embodiment", comprising steps of: an ion conductive material synthesizing step of synthesizing an amorphized ion conductive material by mechanical milling while using a raw material composition containing the above-mentioned $M_1$ element, the above-mentioned $M_2$ element and the above-mentioned S element, and a heating step of obtaining the above-mentioned sulfide solid electrolyte material by heating the above-mentioned amorphized ion conductive material.

According to the first embodiment, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the inclusion of Si allows a sulfide solid electrolyte material having low reduction potential.

Figure 4:
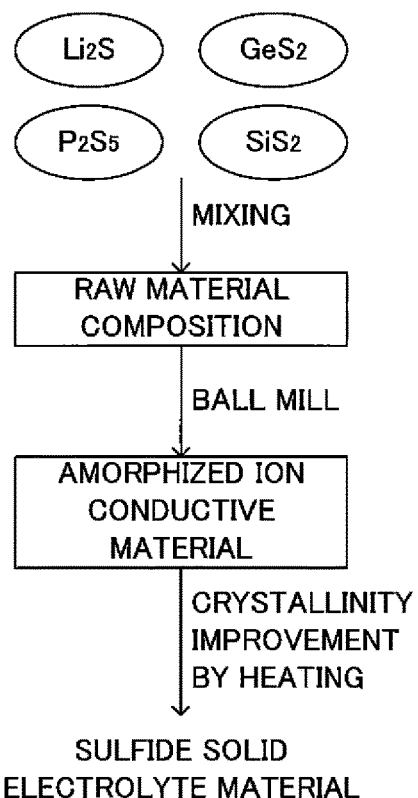
FIG. 4 is an explanatory view showing an example of a producing method for a sulfide solid electrolyte material of the present invention.
Figure 5A:
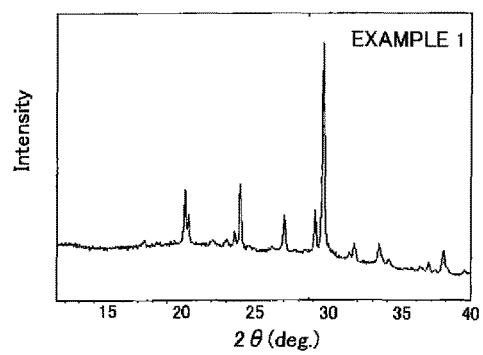
FIGS. 5A to 5D are X-ray diffraction spectra of sulfide solid electrolyte materials obtained in Examples 1 to 4.
Figure 5B:
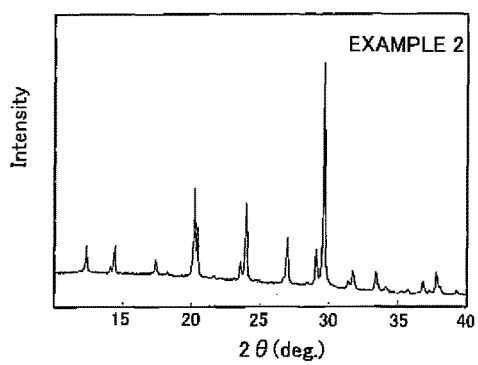
Figure 5C:
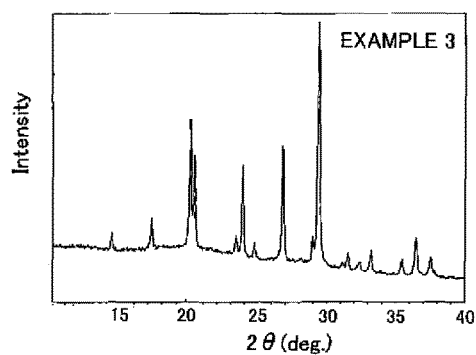
Figure 5D:
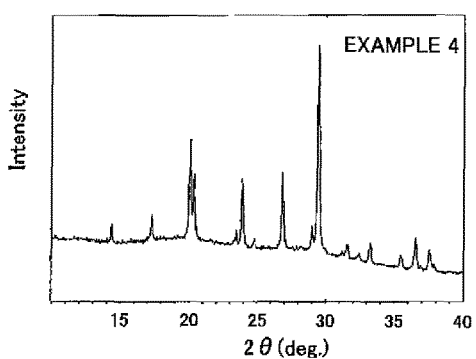

FIG. 4 is an explanatory view showing an example of the producing method for the sulfide solid electrolyte material of the first embodiment. In the producing method for the sulfide solid electrolyte material in FIG. 4, first, a raw material composition is produced by mixing $Li_2S$, $P_2S_5$, $GeS_2$ and $SiS_2$. On this occasion, in order to prevent the raw material composition from being deteriorated due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The first embodiment allows the sulfide solid electrolyte material such that the ratio of a crystal phase having a peak in the vicinity of $2\theta=29.58°$ is high; below, the reason therefor is described. In the first embodiment, the amorphized ion conductive material is once synthesized unlike a solid-phase method as a conventional synthesis method. Thus, it is conceived that an environment such that the crystal phase A with high ion conductivity (the crystal phase having a peak in the vicinity of $2\theta=29.58°$) is easily precipitated is brought and the crystal phase A may be precipitated so positively by the heating step thereafter as to allow a value of $I_B/I_A$ to become less than 0.50, which has been conventionally impossible. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes into an environment such that the crystal phase A is easily precipitated.

The producing method for the sulfide solid electrolyte material of the first embodiment is hereinafter described for each step.

(1) Ion Conductive Material Synthesizing Step

First, an ion conductive material synthesizing step in the first embodiment is described. The ion conductive material synthesizing step in the first embodiment is a step of synthesizing an amorphized ion conductive material by mechanical milling while using a raw material composition containing the above-mentioned $M_1$ element, the above-mentioned $M_2$ element and the above-mentioned S element.

The raw material composition in the first embodiment is not particularly limited if the raw material composition is such as to contain an $M_1$ element, an $M_2$ element and a S element. Incidentally, the $M_1$ element and the $M_2$ element in the raw material composition are the same as the items described in the above-mentioned "A. Sulfide solid electrolyte material". A compound containing the $M_1$ element is not particularly limited but examples thereof include a simple substance of $M_1$ and a sulfide of $M_1$. Examples of the sulfide of $M_1$ include $Li_2S$, $Na_2S$, $K_2S$, $MgS$, $CaS$ and $ZnS$. A compound containing the $M_2$ element is not particularly limited but examples thereof include a simple substance of $M_2$ and a sulfide of $M_2$. Examples of the sulfide of $M_2$ include $Me_2S_3$ (Me is a trivalent element such as Al, B, Ga, In and Sb), $MeS_2$ (Me is a tetravalent element such as Ge, Si, Sn, Zr, Ti and Nb) and $Me_2S_5$ (Me is a pentavalent element such as P and V).

A compound containing the S element is not particularly limited but may be a simple substance or a sulfide. Examples of the sulfide include a sulfide containing the above-mentioned $M_1$ element or $M_2$ element. Also, the raw material composition may contain O element. A compound containing O element is ordinarily an oxide. Kinds of the oxide are not particularly limited but are preferably an oxide containing the above-mentioned $M_1$ element or $M_2$ element. The reason therefor is not to produce an unnecessary side reaction. Examples of the above-mentioned oxide include $Me_2O_3$ (Me is a trivalent element such as Al, B, Ga, In and Sb) $MeO_2$ (Me is a tetravalent element such as Ge, Si, Sn, Zr, Ti and Nb), $Me_2O_5$ (Me is a pentavalent element such as P and V), $Li_5MeO_4$ (Me is a trivalent element such as Al, B, Ga, In and Sb), $Li_4MeO_4$ (Me is a tetravalent element such as Ge, Si, Sn, Zr, Ti and Nb) and $Li_3MeO_4$ (Me is a pentavalent element such as P and V).

Mechanical milling is a method for grinding a test sample while allowing mechanical energy thereto. In the first embodiment, an amorphized ion conductive material is synthesized by allowing mechanical energy to the raw material composition. Examples of such mechanical milling include vibrating mill, ball mill, turbo mill, mechano-fusion and disk mill; among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the first embodiment, the amorphized ion conductive material is preferably synthesized so as to bring an environment such that the crystal phase having a peak in the vicinity of $2\theta=29.58°$ is easily precipitated.

(2) Heating Step

A heating step in the first embodiment is a step of obtaining the above-mentioned sulfide solid electrolyte material by heating the above-mentioned amorphized ion conductive material.

In the first embodiment, the improvement of crystallinity is intended by heating the amorphized ion conductive material. This heating allows the crystal phase A with high ion conductivity (the crystal phase having a peak in the vicinity of $2\theta=29.58°$) to be precipitated so positively as to allow a value of $I_B/I_A$ to become less than 0.50, which has been conventionally impossible.

The heating temperature in the first embodiment is not particularly limited if the heating temperature is a temperature such as to allow a desired sulfide solid electrolyte material, but is preferably a temperature of crystallization temperature or more of the crystal phase A (the crystal phase having a peak in the vicinity of 2θ=29.58°). Specifically, the above-mentioned heating temperature is preferably 300° C. or more, more preferably 350° C. or more, far more preferably 400° C. or more, and particularly preferably 450° C. or more. On the other hand, the above-mentioned heating temperature is preferably 1000° C. or less, more preferably 700° C. or less, far more preferably 650° C. or less, and particularly preferably 600° C. or less. Also, the heating time is preferably adjusted properly so as to allow a desired sulfide solid electrolyte material. Also, heating in the first embodiment is preferably performed under an inert gas atmosphere or in a vacuum from the viewpoint of preventing oxidation. Also, the sulfide solid electrolyte material obtained by the first embodiment is the same as the contents described in the above-mentioned "A. Sulfide solid electrolyte material 1. First embodiment"; therefore, the description here is omitted.

2. Second Embodiment

The producing method for the sulfide solid electrolyte material of the second embodiment is a producing method for the sulfide solid electrolyte material described in "A. Sulfide solid electrolyte material 2. Second embodiment", comprising steps of: an ion conductive material synthesizing step of synthesizing an amorphized ion conductive material by mechanical milling while using a raw material composition containing the above-mentioned $M_1$ element, the above-mentioned $M_{2a}$ element, the above-mentioned $M_{2b}$ element and the above-mentioned S element, and a heating step of obtaining the above-mentioned sulfide solid electrolyte material by heating the above-mentioned amorphized ion conductive material.

According to the second embodiment, amorphization is performed in ion conductive material synthesizing step to thereafter perform the heating step, so as to allow the sulfide solid electrolyte material such that the octahedron O, the tetrahedron $T_1$ and the tetrahedron $T_2$ have a predetermined crystal structure (a three-dimensional structure). Thus, the sulfide solid electrolyte material with favorable ion conductivity may be obtained. In addition, the inclusion of Si allows a sulfide solid electrolyte material having low reduction potential.

The ion conductive material synthesizing step and the heating step in the second embodiment are basically the same as the contents described in the above-mentioned "C. Producing method for sulfide solid electrolyte material 1. First embodiment"; therefore, the description here is omitted. Various kinds of conditions are preferably determined so as to allow a desired sulfide solid electrolyte material.

Incidentally, the present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$, manufactured by Nippon Chemical Industrial Co., Ltd.), lithium oxide ($Li_2O$, manufactured by Kojundo Chemical Lab. Co., Ltd.), phosphorus pentasulfide ($P_2S_5$, manufactured by Sigma-Aldrich Co. LLC.) and silicon sulfide ($SiS_2$, manufactured by Kojundo Chemical Lab. Co., Ltd.) were used as a starting material. These powders were mixed in a glove box under an argon atmosphere at a ratio of 0.34083 g of $Li_2S$, 0.06819 g of $Li_2O$, 0.38049 g of $P_2S_5$ and 0.21047 g of $SiS_2$ to obtain a raw material composition. Next, 1 g of the raw material composition was put in a pot made of zirconia (45 ml) together with zirconia ball (10 mm ϕ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a crystalline sulfide solid electrolyte material having a composition of $Li_{3.4}Si_{0.4}P_{0.6}(S_{0.9}O_{0.1})_4$ was obtained. Incidentally, the above-mentioned composition corresponds to a composition of x=0.6, y=0.1 and δ=1 in $Li_{(4-x)}((M_{2x})_{1-δ}Si_δ)_{(1-x)}P_x(S_{1-y}O_y)_4$.

Example 2

Germanium sulfide ($GeS_2$, manufactured by Kojundo Chemical Lab. Co., Ltd.) was used as a starting material instead of lithium oxide ($Li_2O$), and mixed at a ratio of 0.42166 g of $Li_2S$, 0.35997 g of $P_2S_5$, 0.05906 g of $GeS_2$ and 0.15929 g of $SiS_2$ to obtain a raw material composition. A crystalline sulfide solid electrolyte material was obtained in the same manner as Example 1 except for using this raw material composition. The obtained sulfide solid electrolyte material has a composition of $Li_{3.4}(Ge_{0.2}Si_{0.8})_{0.4}P_{0.6}S_4$, which corresponds to a composition of x=0.6, y=0 and δ=0.8 in $Li_{(4-x)}(Ge_{1-δ}Si_δ)_{(1-x)}P_x(S_{1-y}O_y)_4$.

Example 3

Tin sulfide ($SnS_2$, manufactured by Kojundo Chemical Lab. Co., Ltd.) was used as a starting material instead of lithium oxide ($Li_2O$), and mixed at a ratio of 0.411972 g of $Li_2S$, 0.365571 g of $P_2S_5$, 0.14873 g of $SiS_2$ and 0.073724 g of $SnS_2$ to obtain a raw material composition. A crystalline sulfide solid electrolyte material was obtained in the same manner as Example 1 except for using this raw material composition. The obtained sulfide solid electrolyte material has a composition of $Li_{3.38}(Sn_{0.2}Si_{0.8})_{0.38}P_{0.62}S_4$, which corresponds to a composition of x=0.62, y=0 and δ=0.8 in $Li_{(4-x)}(Sn_{1-δ}Si_δ)_{(1-x)}P_x(S_{1-y}O_y)_4$.

Example 4

Tin sulfide ($SnS_2$, manufactured by Kojundo Chemical Lab. Co., Ltd.) was used as a starting material instead of lithium oxide ($Li_2O$), and mixed at a ratio of 0.37861 g of $Li_2S$, 0.39526 g of $P_2S_5$, 0.0401 g of $SiS_2$ and 0.185927 g of $SnS_2$ to obtain a raw material composition. A crystalline sulfide solid electrolyte material was obtained in the same manner as Example 1 except for using this raw material composition. The obtained sulfide solid electrolyte material has a composition of $Li_{3.29}$ $(Sn_{0.7}Si_{0.3})_{0.29}P_{0.71}S_4$, which corresponds to a composition of x=0.71, y=0 and δ=0.3 in $Li_{(4-x)}(Sn_{1-\delta}Si_\delta)_{(1-x)}P_x(S_{1-y}O_y)_4$.

Example 5

Tin sulfide ($SnS_2$, manufactured by Kojundo Chemical Lab. Co., Ltd.) was used as a starting material instead of lithium oxide ($Li_2O$), and mixed at a ratio of 0.383807 g of $Li_2S$, 0.366893 g of $P_2S_5$, 0.0627309 g of $SiS_2$ and 0.186569 g of $SnS_2$ to obtain a raw material composition. A crystalline sulfide solid electrolyte material was obtained in the same manner as Example 1 except for using this raw material composition. The obtained sulfide solid electrolyte material has a composition of $Li_{3.34}(Sn_{0.7}Si_{0.3})_{0.34}P_{0.66}S_4$, which corresponds to a composition of x=0.66, y=0 and δ=0.3 in $Li_{(4-x)}(Sn_{1-\delta}Si_\delta)_{(1-x)}P_x(S_{1-y}O_y)_4$.

Example 6

Germanium sulfide ($GeS_2$, manufactured by Kojundo Chemical Lab. Co., Ltd.) was used as a starting material instead of lithium oxide ($Li_2O$), and mixed at a ratio of 0.415120 g of $Li_2S$, 0.375416 g of $P_2S_5$, 0.128062 g of $SiS_2$ and 0.0814011 g of $GeS_2$ to obtain a raw material composition. A crystalline sulfide solid electrolyte material was obtained in the same manner as Example 1 except for using this raw material composition. The obtained sulfide solid electrolyte material has a composition of $Li_{3.38}$ $(Ge_{0.3}Si_{0.7})_{0.38}P_{0.62}S_4$, which corresponds to a composition of x=0.62, y=0 and δ=0.7 in $Li_{(4-x)}(Ge_{1-\delta}Si_\delta)_{(1-x)}P_x(S_{1-y}O_y)_4$.

Example 7

Germanium sulfide ($GeS_2$, manufactured by Kojundo Chemical Lab. Co., Ltd.) was used as a starting material instead of lithium oxide ($Li_2O$), and mixed at a ratio of 0.407909 g of $Li_2S$, 0.368895 g of $P_2S_5$, 0.0898839 g of $SiS_2$ and 0.1333119 g of $GeS_2$ to obtain a raw material composition. A crystalline sulfide solid electrolyte material was obtained in the same manner as Example 1 except for using this raw material composition. The obtained sulfide solid electrolyte material has a composition of $Li_{3.37}(Ge_{0.5}Si_{0.5})_{0.37}P_{0.63}S_4$, which corresponds to a composition of x=0.63, y=0 and δ=0.5 in $Li_{(4-x)}(Ge_{1-\delta}Si_\delta)_{(1-x)}P_x(S_{1-y}O_y)_4$.

Comparative Example 1

$Li_2S$, $P_2S_5$ and $GeS_2$ were used as a starting material and mixed at a ratio of 0.39019 g of $Li_2S$, 0.377515 g of $P_2S_5$ and 0.232295 g of $GeS_2$ to obtain a raw material composition. A crystalline sulfide solid electrolyte material was obtained in the same manner as Example 1 except for using this raw material composition. The obtained sulfide solid electrolyte material has a composition of $Li_{3.33}Ge_{0.33}P_{0.67}S_4$, which corresponds to a composition of x=0.67, y=0 and δ=0 in $Li_{(4-x)}(Ge_{1-\delta}Si_\delta)_{(1-x)}P_x(S_{1-y}O_y)_4$.

Comparative Example 2

$Li_2S$, $P_2S_5$ and $SnS_2$ were used as a starting material and mixed at a ratio of 0.365069 g of $Li_2S$, 0.390958 g of $P_2S_5$ and 0.243972 g of $SnS_2$ to obtain a raw material composition. A crystalline sulfide solid electrolyte material was obtained in the same manner as Example 1 except for using this raw material composition. The obtained sulfide solid electrolyte material has a composition of $Li_{3.275}Sn_{0.275}P_{0.725}S_4$, which corresponds to a composition of x=0.725, y=0 and δ=0 in $Li_{(4-x)}(Sn_{1-\delta}Si_\delta)_{(1-x)}P_x(S_{1-y}O_y)_4$.

[Evaluations]

(X-Ray Diffraction Measurement)

Figure 6A:
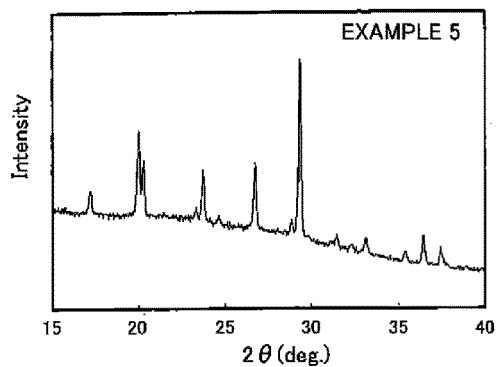
FIGS. 6A to 6C are X-ray diffraction spectra of sulfide solid electrolyte materials obtained in Examples 5 to 7.
Figure 6C:
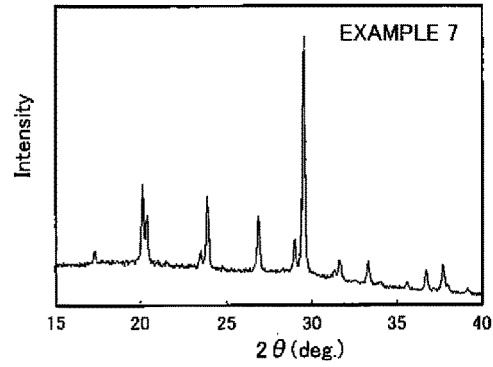
Figure 6B:
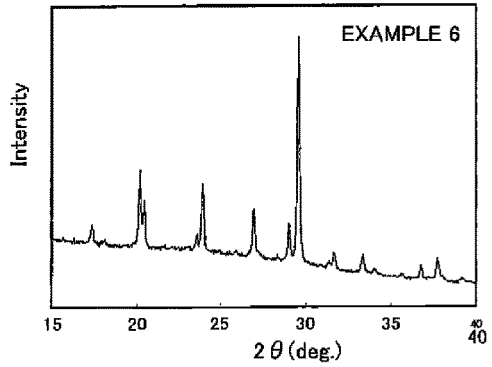
Figure 7A:
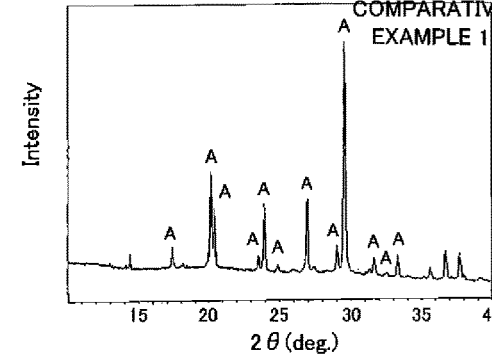
FIGS. 7A and B are X-ray diffraction spectra of sulfide solid electrolyte materials obtained in Comparative Examples 1 and 2.
Figure 7B:
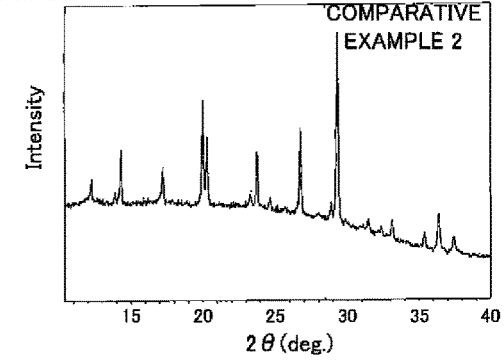
Figure 8A:
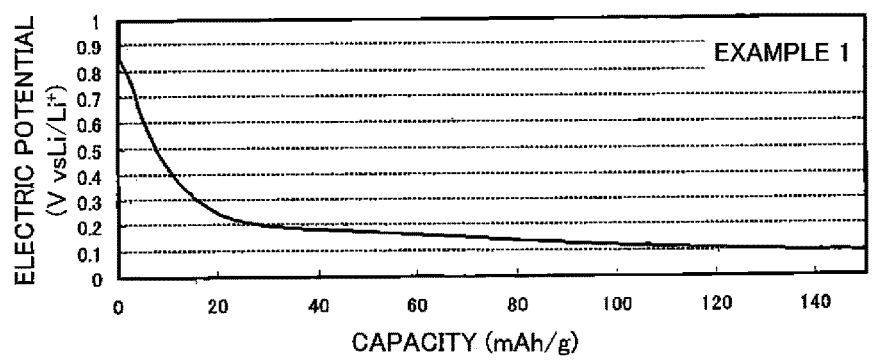
FIGS. 8A to 8D are charging curves of evaluation batteries using sulfide solid electrolyte materials obtained in Examples 1 to 4.
Figure 8B:
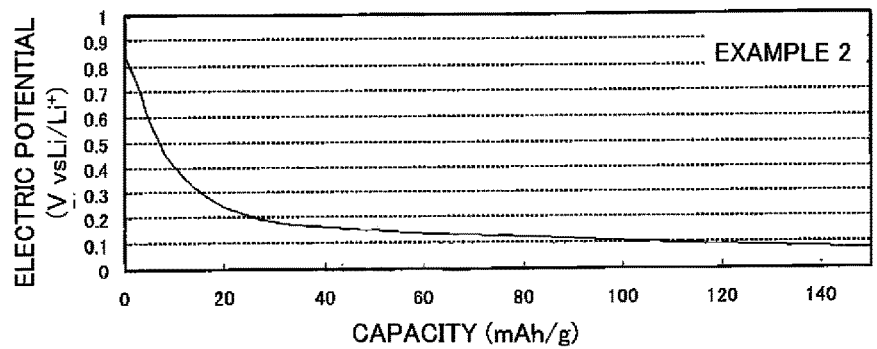
Figure 8C:
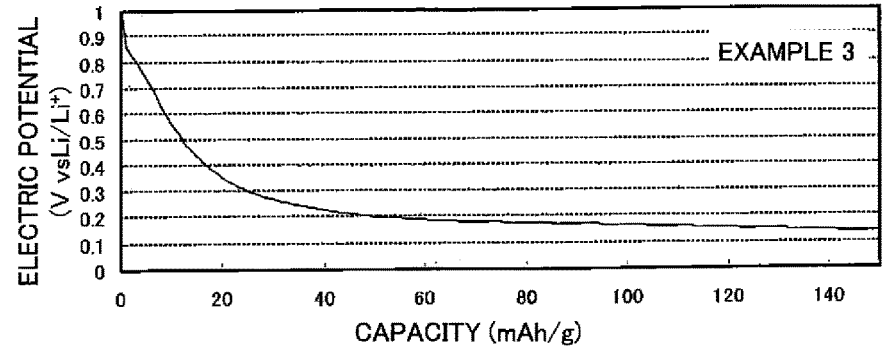
Figure 8D:
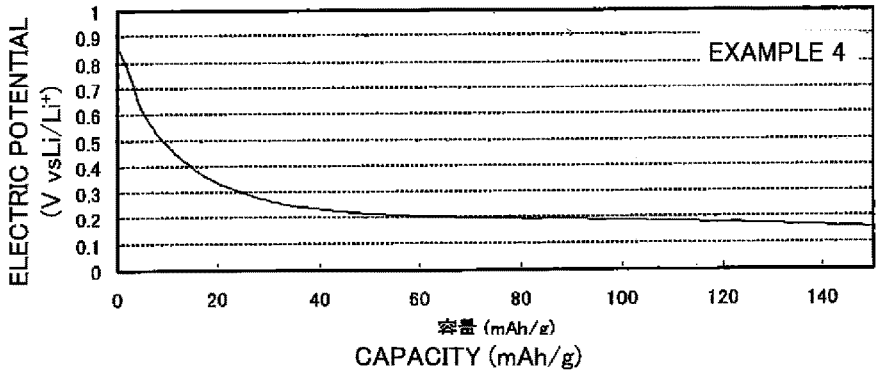

X-ray diffraction (XRD) measurement was performed while using the sulfide solid electrolyte material obtained in Examples 1, to 7 and Comparative Examples 1 and 2. XRD measurement was performed for a powder sample under an inert atmosphere on the conditions of using a CuKα line. The results are shown in FIGS. 5 to 7. As shown in FIG. 7A, in Comparative Example 1, a peak appeared at a position of 2θ=17.38°, 20.18°, 20.44°, 23.56°, 23.96°, 24.93°, 26.96°, 29.07°, 29.58°, 31.71°, 32.66° and 33.39°. These peaks are conceived to be the peaks of the crystal phase A with high ion conductivity. Incidentally, the peak of 2θ=27.33°±0.50° as the peak of the crystal phase B with low ion conductivity was not confirmed. Also, it was confirmed that Comparative Example 2 and Examples 1 to 7 had the same diffraction pattern as Comparative Example 1.

(X-Ray Structural Analysis)

The crystal structure of the sulfide solid electrolyte material obtained in Comparative Example 1 was identified by X-ray structural analysis. The crystal system and crystallographic group were determined by a direct method on the basis of a diffraction pattern obtained in XRD to thereafter identify the crystal structure by a real space method. As a result, it was confirmed that the sulfide solid electrolyte material had the above-mentioned crystal structure as shown in FIG. 2. That is to say, the crystal structure was such that the tetrahedron $T_1$ ($GeS_4$ tetrahedron and $PS_4$ tetrahedron) and the octahedron O ($LiS_6$ octahedron) shared an edge, and the tetrahedron $T_2$ ($PS_4$ tetrahedron) and the octahedron O ($LiS_6$ octahedron) shared a corner. Also, as described above, Examples 1 to 7 had the same diffraction pattern as Comparative Example 1, so that it was confirmed that the same crystal structure was formed in Examples 1 to 7.

(Reduction Potential Measurement)

An evaluation battery was produced by using powder of the sulfide solid electrolyte material obtained in Examples 1 to 7 and Comparative Examples 1 and 2. First, 100 mg of the sulfide solid electrolyte material was added to a cylinder made of macole and pressed at 1 ton/cm² to form a solid electrolyte layer. Next, SUS powder and the sulfide solid electrolyte material were weighed so as to be SUS powder: the sulfide solid electrolyte material=80:20 at weight ratio, and mixed by an agate mortar. Thus, a working electrode mixture was obtained. 12 mg of this working electrode mixture was added on one surface of the solid electrolyte layer and pressed at 4 ton/cm² to form a working electrode on the solid electrolyte layer. Next, an LiIn foil was disposed on the other surface of the solid electrolyte layer and pressed at 1 ton/cm² to form a reference electrode. Thus, a power generating element was obtained. The power generating element was bound at 6 Ncm to obtain an evaluation battery.

Figure 9A:
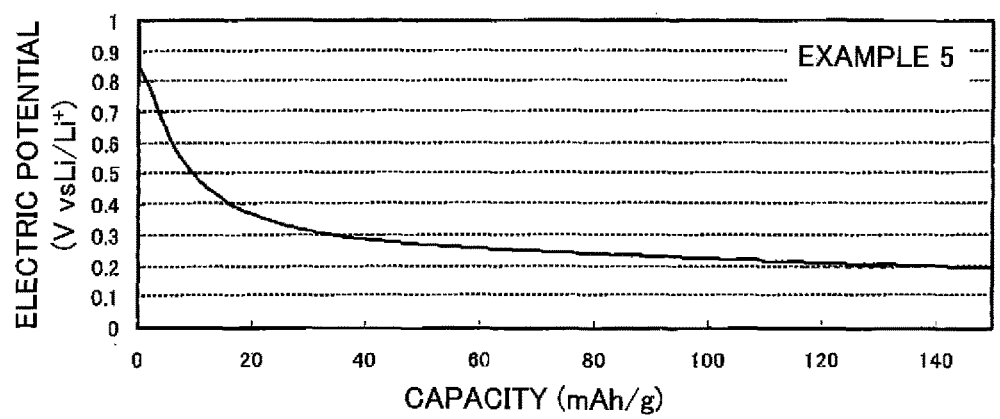
FIGS. 9A to 9C are charging curves of evaluation batteries using sulfide solid electrolyte materials obtained in Examples 5 to 7.
Figure 9B:
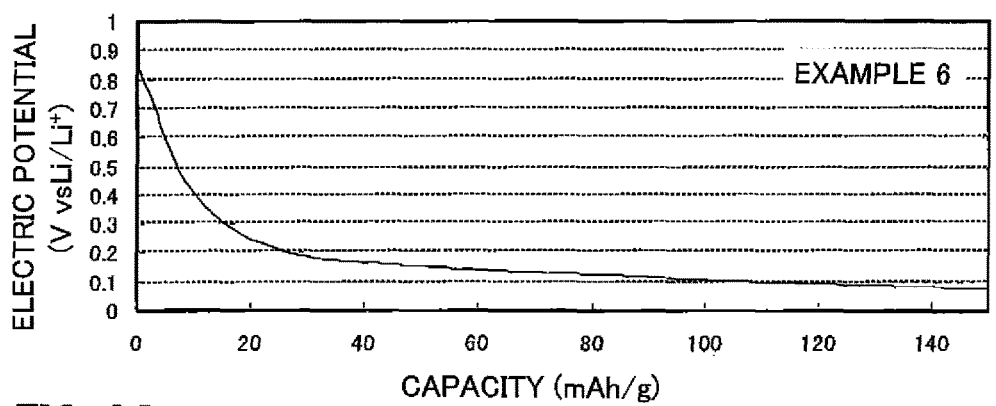
Figure 9C:
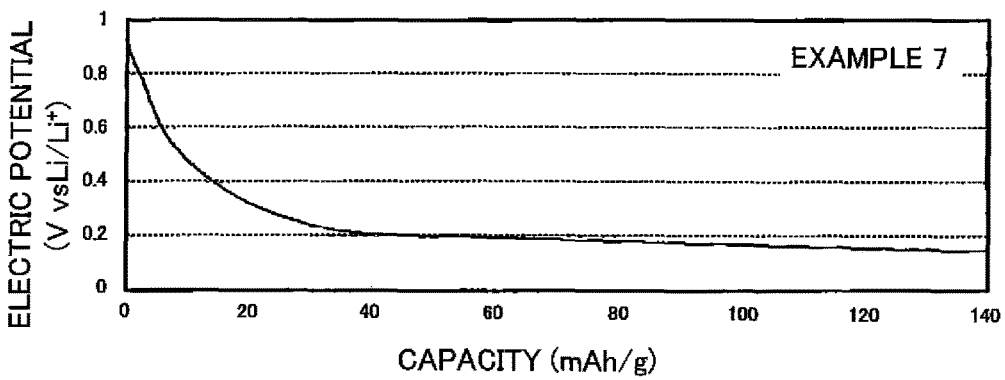
Figure 10A:
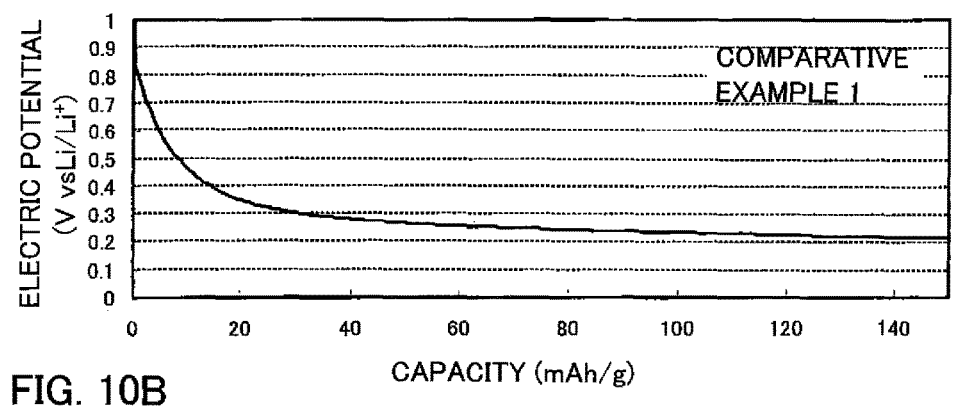
FIGS. 10A and B are charging curves of evaluation batteries using sulfide solid electrolyte materials obtained in Comparative Examples 1 and 2.
Figure 10B:
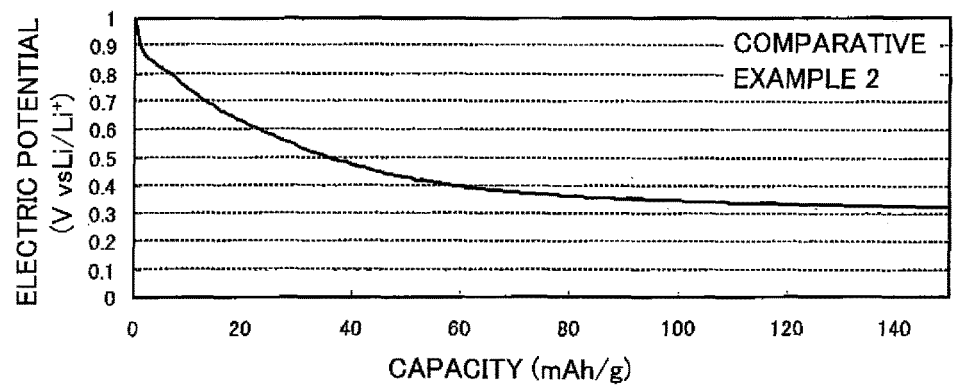
Figure 12A:
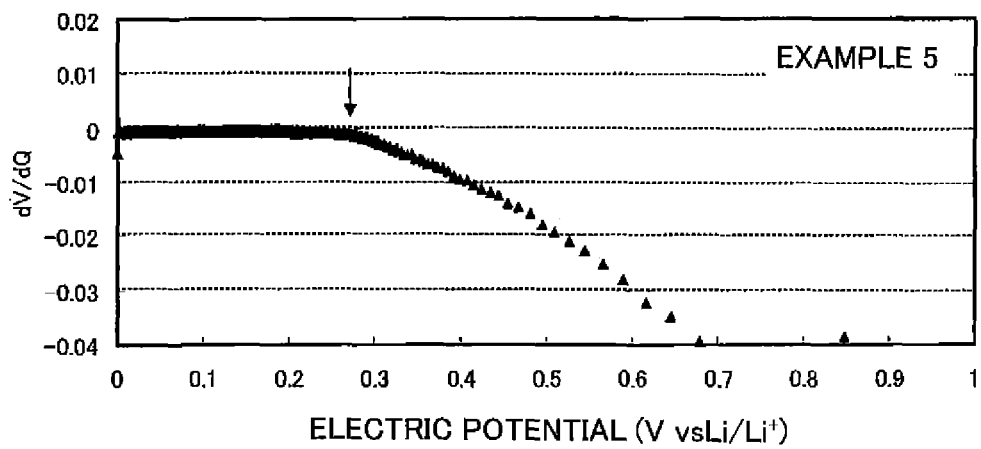
FIGS. 12A to 12C are graphs showing relations between electric potential and dV/dQ in evaluation batteries using sulfide solid electrolyte materials obtained in Examples 5 to 7.
Figure 12B:
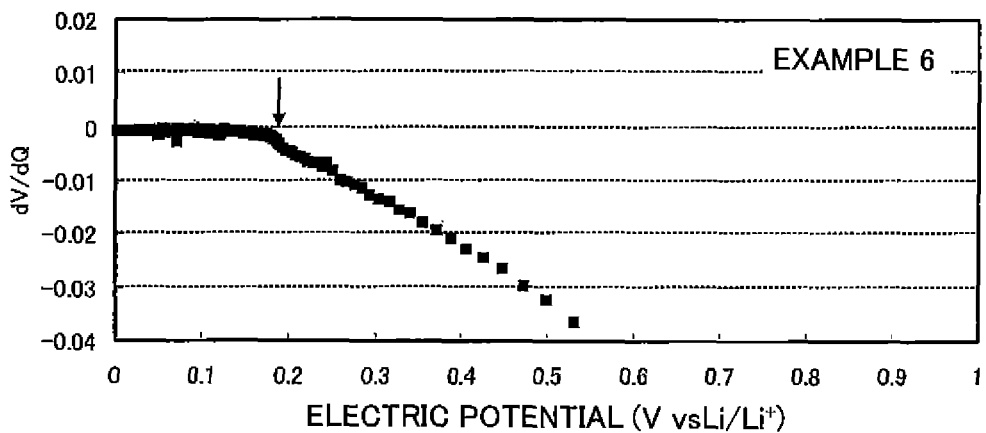
Figure 12C:
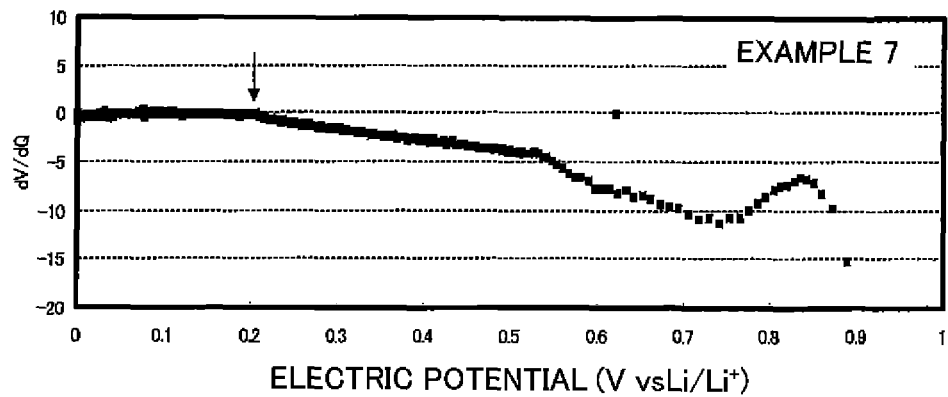
Figure 13A:
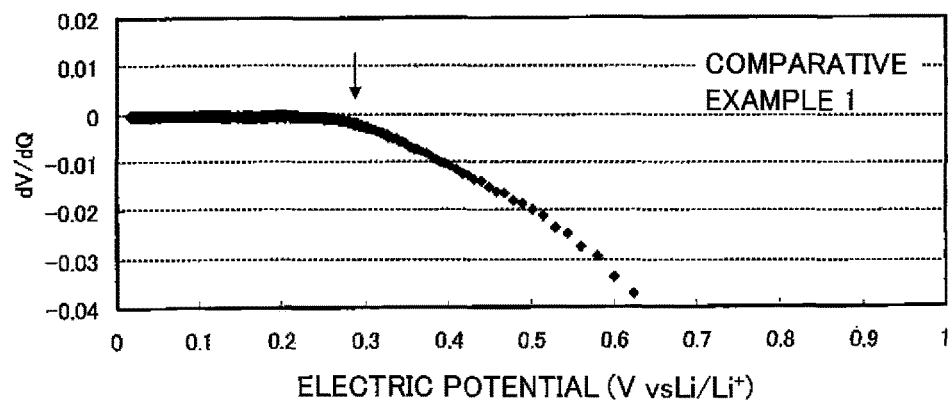
FIGS. 13A and 13B are graphs showing relations between electric potential and dV/dQ in evaluation batteries using sulfide solid electrolyte materials obtained in Comparative Examples 1 and 2.
Figure 13B:
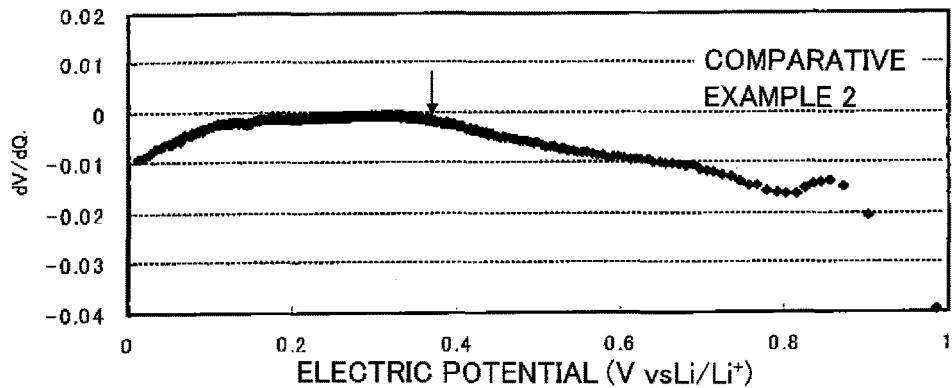

Constant-current charge was performed up to −0.62 V at a current density of 0.15 mA/cm² while using the obtained evaluation battery. Thus, a charging curve such as to regard a lateral axis as capacity and a vertical axis as electric potential of the working electrode (vs. LiIn) was obtained. 0.62 V was added to electric potential of the obtained charging curve to shift potential reference from LiIn to $Li/Li^+$ (FIGS. 8 to 10). In the shifted charging curve, electric potential was differentiated with respect to capacity to make a graph such as to regard a lateral axis as electric potential and a vertical axis as dV/dQ (FIGS. 11 to 13). An intersection point of a straight line part A, in which the value of dV/dQ is within a range of −0.01 to 0.01, and a straight line part B having slope is conceived to be reduction potential, and the maximum potential in the straight line part A, offering dV/dQ=0, was defined as reduction potential. The results of Examples 1 to 4 and Comparative Examples 1 and 2 are shown in FIGS. 14A and 14B. In FIG. 14A, in comparing Example 2 with Comparative Example 1 as LiGePS-based, it was confirmed that reduction potential lowered by substituting part of Ge with Si. In FIG. 14B, in comparing Examples 3 and 4 with Comparative Example 2 as LiSnPS-based, it was confirmed that reduction potential lowered by substituting part of Sn with Si. Incidentally, it was confirmed that Example 1 was LiSiPSO-based but had the same reduction potential as Examples 2 to 4.

(Li Ion Conductance Measurement)

Li ion conductance at a temperature of 25° C. was measured while using the sulfide solid electrolyte material obtained in Examples 1 to 4 and Comparative Examples 1 and 2. First, a test sample was weighed by a suitable amount in a glove box of an argon atmosphere, put in a polyethylene terephthalate tube (a PET tube, an inside diameter of 10 mm, an outside diameter of 30 mm, a height of 20 mm), and held between powder molding jigs made of carbon tool steel S45C anvil from the top and bottom. Next, the test sample was pressed at an indicating pressure of 6 MPa (a molding pressure of approximately 110 MPa) by using a uniaxial pressing machine (P-6™ manufactured by Rikenseiki Co., Ltd.), and molded into pellets with a diameter of 10 mm and an optional thickness. Next, gold powder (manufactured by The Nilaco Corporation, treelike, a particle diameter of approximately 10 μm) was mounted by 13 mg to 15 mg on both sides of the pellets, and dispersed uniformly on the surface of the pellets, which were molded at an indicating pressure of 30 MPa (a molding pressure of approximately 560 MPa). Thereafter, the obtained pellets were put in a closed electrochemical cell which may maintain an argon atmosphere.

Figure 15A:
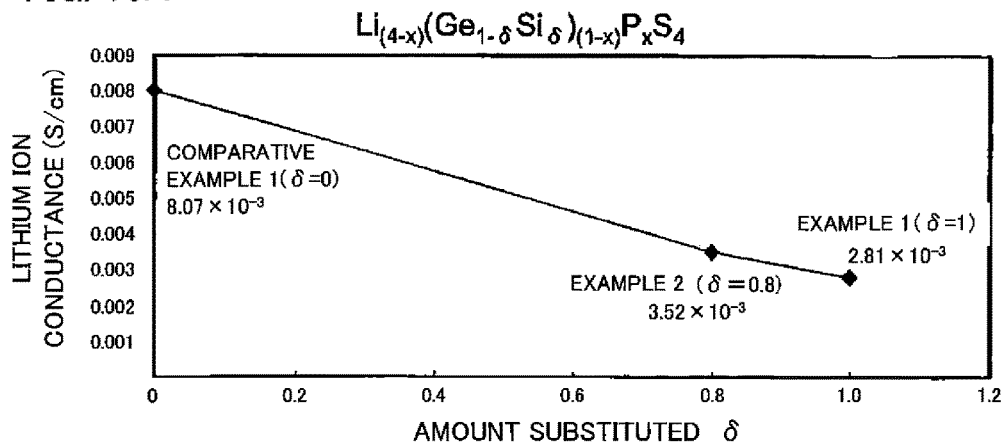
FIGS. 15A and 15B are results of measuring Li ion conductance of sulfide solid electrolyte materials obtained in Examples 1 to 4 and Comparative Examples 1 and 2.
Figure 15B:
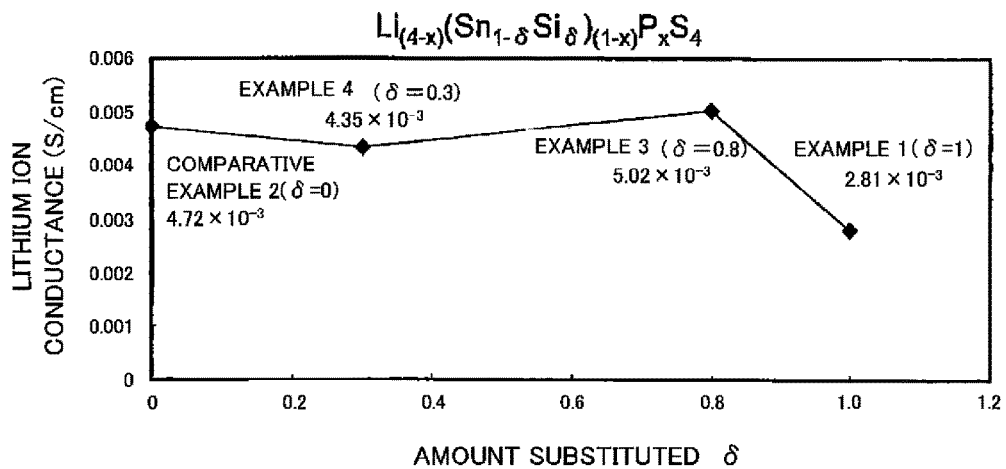

An impedance gain-phase analyzer manufactured by Solartron Inc. (solartron 1260™) was used for the measurement as FRA (Frequency Response Analyzer), and a small-sized environmental tester (Espec corp, SU-241™, −40° C. to 150° C.) was used as a constant temperature unit. The measurement was started from a high-frequency range on the conditions of an alternating voltage of 10 mV to 1000 mV, a frequency range of 1 Hz to 10 MHz, an integration time of 0.2 second, and a temperature of 23° C. Zplot™ was used for measurement software and Zview™ was used for analysis software. The obtained results are shown in FIGS. 15A and 15B. As shown in FIGS. 15A and 15B, any sulfide solid electrolyte material obtained in Examples 1 to 4 and Comparative Examples 1 and 2 exhibited high Li ion conductance. It was confirmed in noticing amount substituted δ that the case of δ<1 exhibited higher Li ion conductance than the case of δ=1.

(Influence of Lattice Constant on Reduction Potential)

A relation between lattice constant and reduction potential of the sulfide solid electrolyte material obtained in Examples 1 to 3 and 5 and Comparative Examples 1 and 2 was examined. The lattice constant was measured in the following manner. First, the obtained sulfide solid electrolyte material was filled into a ϕ0.5-mm capillary made of quartz to obtain the data of XRD pattern at a wavelength of 0.5 Å in a high-intensity synchrotron radiation facility (Spring-8). The lattice constant was calculated by Rietveld analysis on the basis of the obtained data. On that occasion, a space group was determined at $P4_2/nmc(137)$. The results are shown in FIG. 16 and Table 1.

TABLE 1

| | COMPOSITION | a-AXIAL LENGTH (Å) | c-AXIAL LENGTH (Å) | REDUCTION POTENTIAL (V vs. Li/Li+) |
|---|---|---|---|---|
| EXAMPLE 1 | $Li_{3.4}Si_{0.4}P_{0.6}(S_{0.9}O_{0.1})_4$ | 8.65660 | 12.5278 | 0.1766 |
| EXAMPLE 2 | $Li_{3.4}(Ge_{0.2}Si_{0.8})_{0.4}P_{0.6}S_4$ | 8.67336 | 12.5501 | 0.1756 |
| EXAMPLE 3 | $Li_{3.38}(Sn_{0.2}Si_{0.8})_{0.38}P_{0.62}S_4$ | 8.69077 | 12.5940 | 0.1768 |
| EXAMPLE 5 | $Li_{3.33}(Sn_{0.7}Si_{0.3})_{0.33}P_{0.67}S_4$ | 8.71861 | 12.6855 | 0.2700 |
| COMPARATIVE EXAMPLE 1 | $Li_{3.33}Ge_{0.33}P_{0.67}S_4$ | 8.69407 | 12.5994 | 0.2558 |
| COMPARATIVE EXAMPLE 2 | $Li_{3.275}Sn_{0.275}P_{0.725}S_4$ | 8.74385 | 12.7257 | 0.3374 |

Figure 16:
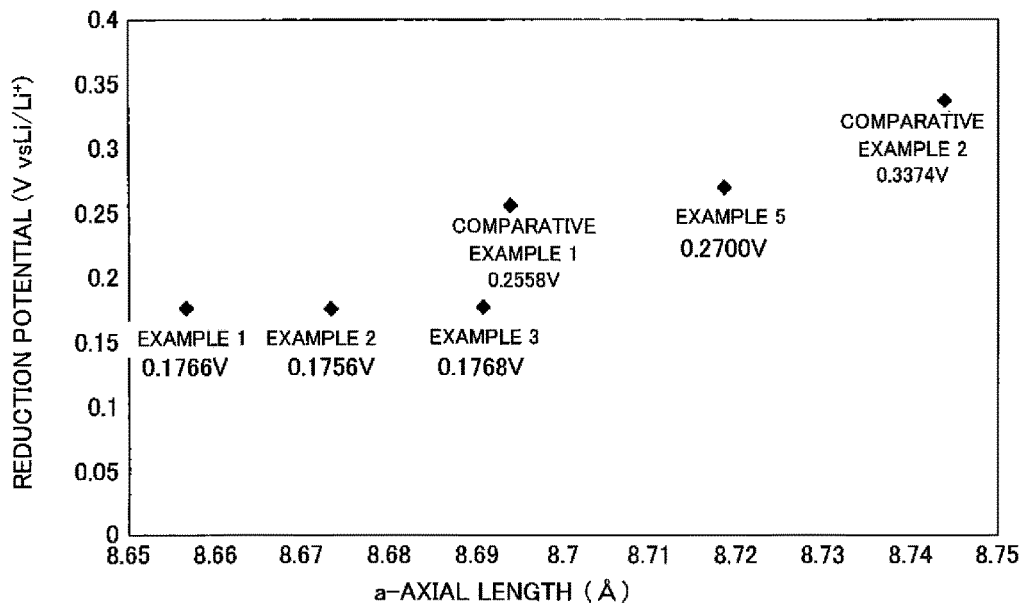
FIG. 16 is a graph showing relations between lattice constant and reduction potential of sulfide solid electrolyte materials obtained in Examples 1 to 3 and 5 and Comparative Examples 1 and 2.

As shown in FIG. 16 and Table 1, in the case where the a-axial length was 8.69 Å or less, it was confirmed that reduction potential lowered further.

(Influence of Li Amount on Reduction Potential)

Figure 17:
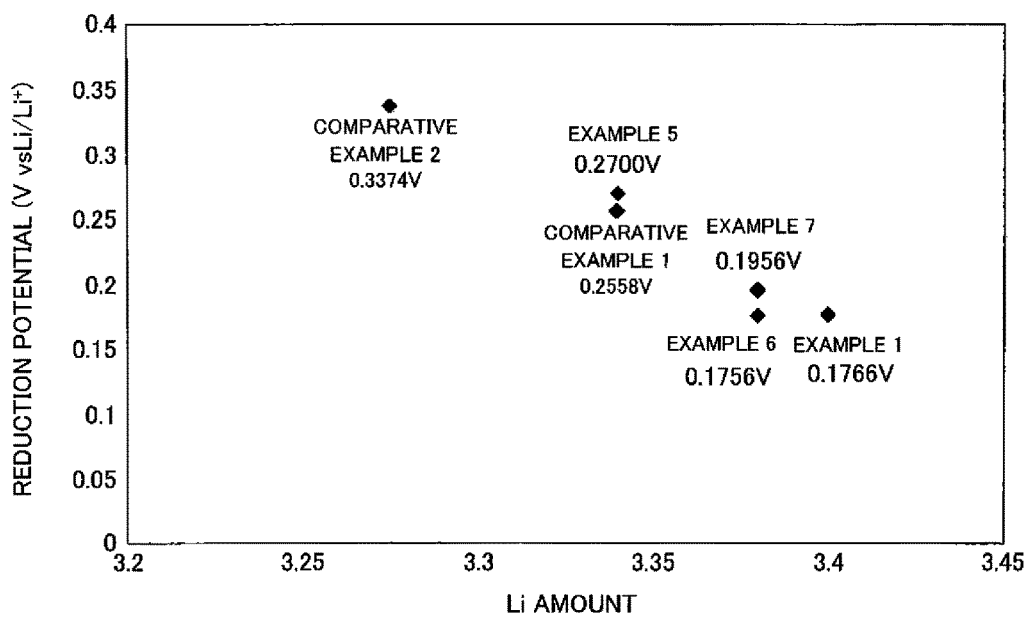
FIG. 17 is a graph showing relations between Li amount and reduction potential of sulfide solid electrolyte materials obtained in Examples 1 and 5 to 7 and Comparative Examples 1 and 2.

A relation between Li amount and reduction potential of the sulfide solid electrolyte material obtained in Examples 1 and 5 to 7 and Comparative Examples 1 and 2 was examined. The results are shown in FIG. 17 and Table 2.

TABLE 2

| | COMPOSITION | Li AMOUNT | REDUCTION POTENTIAL (V vs. Li/Li+) |
|---|---|---|---|
| EXAMPLE 1 | $Li_{3.4}Si_{0.4}P_{0.6}(S_{0.9}O_{0.1})_4$ | 3.4 | 0.1766 |
| EXAMPLE 5 | $Li_{3.33}(Sn_{0.7}Si_{0.3})_{0.33}P_{0.67}S_4$ | 3.33 | 0.2700 |
| EXAMPLE 6 | $Li_{3.38}(Ge_{0.3}Si_{0.7})_{0.38}P_{0.62}S_4$ | 3.38 | 0.1756 |
| EXAMPLE 7 | $Li_{3.38}(Ge_{0.3}Si_{0.7})_{0.38}P_{0.62}S_4$ | 3.38 | 0.1956 |
| COMPARATIVE | $Li_{3.33}Ge_{0.33}P_{0.67}S_4$ | 3.33 | 0.2558 |

TABLE 2-continued

| | COMPOSITION | Li AMOUNT | REDUCTION POTENTIAL (V vs. Li/Li+) |
|---|---|---|---|
| EXAMPLE 1 COMPARATIVE EXAMPLE 2 | $Li_{3.275}Sn_{0.275}P_{0.725}S_4$ | 3.275 | 0.3374 |

Figure 18:
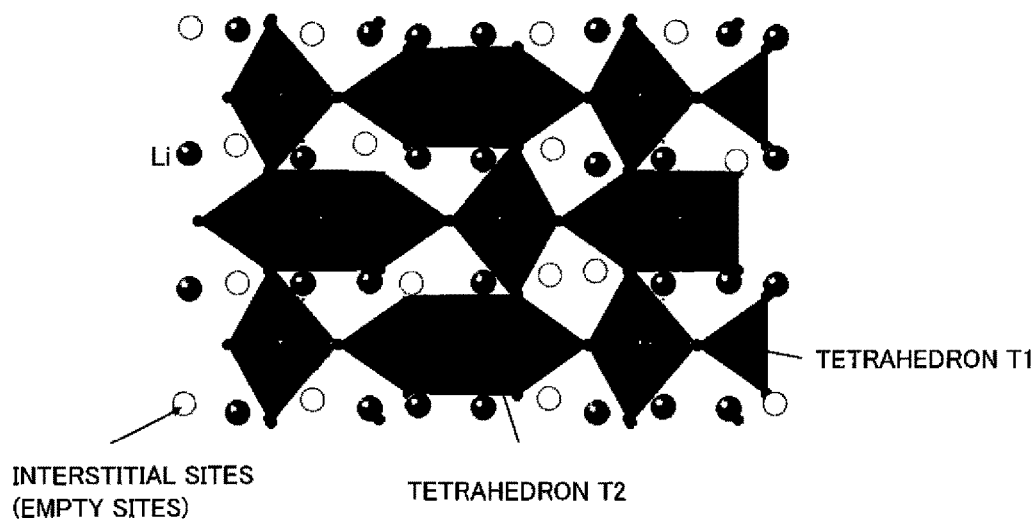
FIG. 18 is a crystalline arrangement drawing explaining the effects of the present invention.

As shown in FIG. 17 and Table 2, in the case where the Li amount was 3.35 or more, it was confirmed that reduction potential lowered further. As shown in FIG. 18, this fact is conceived to be such that the new entrance of Li into interstitial sites (empty sites) causes the place of Li for intruding into the sulfide solid electrolyte material to decrease and causes reduction potential to lower.

Reference Example 1

Lithium sulfide ($Li_2S$), lithium oxide ($Li_2O$), phosphorus pentasulfide ($P_2S_5$) and germanium sulfide ($GeS_2$) were used as a starting material. These powders were mixed in a glove box under an argon atmosphere at a ratio of 0.3495 g of $Li_2S$, 0.03082 g of $Li_2O$, 0.372641 g of $P_2S_5$ and 0.2469 g of $GeS_2$ to obtain a raw material composition. The obtained raw material composition was ground by using vibrating mill. TI-100™ manufactured by Cosmic Mechanical Technology Co., Ltd. was used for vibrating mill. Specifically, 1 g of the raw material composition and a vibrator made of alumina ($\phi$36.3 mm, height 48.9 mm) were put in a 10-mL pot and treated at the number of revolutions of 1440 rpm for 30 minutes. Thus, an amorphized ion conductive material was obtained.

Next, the obtained ion conductive material was molded into pellets, and the obtained pellets were put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled down to room temperature. Thus, a crystalline sulfide solid electrolyte material having a composition of $Li_{3.35}Ge_{0.35}P_{0.65}S_{3.8}O_{0.2}$ was obtained. Incidentally, the above-mentioned composition corresponds to a composition of x=0.65 and y=0.2 in $Li_{(4-x)}Ge_{(1-x)}P_xS_{4-y}O_y$. The oxygen amount substituted is 5%.

Reference Example 2

A crystalline sulfide solid electrolyte material was obtained in the same manner as Reference Example 1 except for using a mixture at a ratio of 0.30728 g of $Li_2S$, 0.06269 g of $Li_2O$, 0.378922 g of $P_2S_5$ and 0.251096 g of $GeS_2$ as a raw material composition. The obtained sulfide solid electrolyte material has a composition of $Li_{3.35}Ge_{0.35}P_{0.65}S_{3.6}O_{0.4}$, which corresponds to a composition of x=0.65 and y=0.4 in $Li_{(4-x)}Ge_{(1-x)}P_xS_{4-y}O_y$. The oxygen amount substituted is 10%.

Reference Example 3

A crystalline sulfide solid electrolyte material was obtained in the same manner as Reference Example 1 except for using a mixture at a ratio of 0.190304 g of $Li_2S$, 0.150803 g of $Li_2O$, 0.3962890 g of $P_2S_5$ and 0.262604 g of $GeS_2$ as a raw material composition. The obtained sulfide solid electrolyte material has a composition of $Li_{3.35}Ge_{0.35}P_{0.65}S_{3.08}O_{0.92}$, which corresponds to a composition of x=0.65 and y=0.92 in $Li_{(4-x)}Ge_{(1-x)}P_xS_{4-y}O_y$. The oxygen amount substituted is 23%.

Reference Example 4

A crystalline sulfide solid electrolyte material was obtained in the same manner as Reference Example 1 except for using a mixture at a ratio of 0.390529 g of $Li_2S$, 0.366564 g of $P_2S_5$ and 0.242907 g of $GeS_2$ as a raw material composition. The obtained sulfide solid electrolyte material has a composition of $Li_{3.35}Ge_{0.35}P_{0.65}S_4$, which corresponds to a composition of x=0.65 and y=0 in $Li_{(4-x)}Ge_{(1-x)}P_xS_{4-y}O_y$. The oxygen amount substituted is 0%.

[Evaluations]
(Li Ion Conductance Measurement)

Li ion conductance at a temperature of 25° C. was measured while using the sulfide solid electrolyte material obtained in Reference Examples 1 to 4. The measurement conditions are the same as the above-mentioned contents. The obtained results are shown in FIG. 19.

Figure 19:
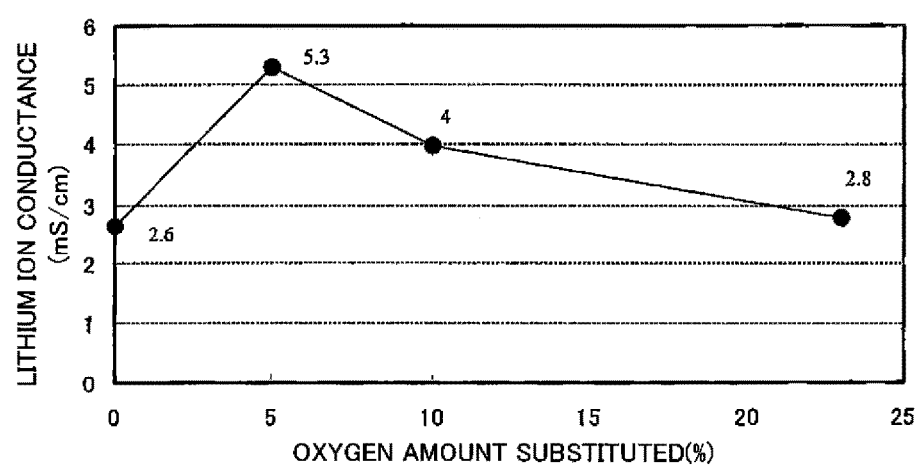
FIG. 19 is a result of measuring Li ion conductance of sulfide solid electrolyte materials obtained in Reference Examples 1 to 4.

As shown in FIG. 19, it was confirmed that Li ion conductance was high in Reference Examples 1 to 3 such that sulfur was substituted with oxygen as compared with Reference Example 4 such that sulfur was not substituted with oxygen. The reason why Li ion conductance of the sulfide solid electrolyte material obtained in Reference Examples 1 to 3 is high is conceived to be that the introduction of the O element causes the size of a tunnel through which an Li ion passes (a tunnel existing in a crystal) to change into a size for allowing easier conduction.

REFERENCE SIGNS LIST 1 cathode active material layer
2 anode active material layer
3 electrolyte layer
4 cathode current collector
5 anode current collector
6 battery case
10 battery

The invention claimed is:

1. A sulfide solid electrolyte material comprising an $M_1$ element, an $M_2$ element and a S element wherein
the $M_1$ comprises at least Li;
the $M_2$ is P, Si and an element other than P and Si;
the other element is at least one selected from the group consisting of Sn, Ti, Zr, and Nb;
the sulfide solid electrolyte material has a peak at a position of 2θ=20.18°±0.50°, 20.44°±0.50°, 26.96°±0.50° and 29.58°±0.50° in X-ray diffraction measurement using a CuKα line; and
when a diffraction intensity at the peak of 2θ=29.58°±0.50° is regarded as $I_A$ and a diffraction intensity at a peak of 2θ=27.33°±0.50° is regarded as $I_B$, a value of $I_B/I_A$ is less than 0.50, wherein the sulfide solid electrolyte material is represented by $Li_{(4-x)}(M_{2x(1-\delta)}Si_\delta)_{(1-x)}P_x(S_{1-y}O_y)_4$ ($M_{2x}$ is at least one selected from the group consisting of Sn, Zr, Ti and Nb, $0<x<1$, $0\leq y\leq 0.25$, $0<\delta<1$).

2. A sulfide solid electrolyte material comprising an $M_1$ element, an $M_2$ element and a S element wherein
the $M_1$ comprises at least Li;
the $M_2$ is P, Si and an element other than P and Si;
the other element is at least one selected from the group consisting of Sn, Ti, Zr, and Nb;
the sulfide solid electrolyte material has a peak at a position of $2\theta=20.18°\pm 0.50°$, $20.44°\pm 0.50°$, $26.96°\pm 0.50°$ and $29.58°\pm 0.50°$ in X-ray diffraction measurement using a CuKα line; and either
the sulfide solid electrolyte material has a peak at a position of $2\theta=27.33°\pm 0.50°$ in X-ray diffraction measurement using a CuKα line, and the sulfide solid electrolyte material does not have a peak at a position of $2\theta=27.33°\pm 0.50°$ in X-ray diffraction measurement using a CuKα line; or
when a diffraction intensity at the peak of $2\theta=29.58°\pm 0.50°$ is regarded as $I_A$ and a diffraction intensity at the peak of $2\theta=27.33°\pm 0.50°$ is regarded as $I_B$, a value of $I_B/I_A$ is less than 0.50, and
wherein the sulfide solid electrolyte material is represented by $Li_{(4-x)}(M_{2x(1-\delta)}Si_\delta)_{(1-x)}P_x(S_{1-y}O_y)_4$ ($M_{2x}$ is at least one selected from the group consisting of Sn, Zr, Ti and Nb, $0<x<1$, $0\leq y\leq 0.25$, $0<\delta<1$).

3. The sulfide solid electrolyte material according to claim 1, wherein a molar fraction of Si to the $M_2$ excluding P is 30% or more.

4. The sulfide solid electrolyte material according to claim 1, wherein an a-axial length of a lattice constant is within a range of 8.66 A to 8.69 A in a crystal phase having a peak at the position of $2\theta=29.58°\pm 0.50°$.

5. The sulfide solid electrolyte material according to claim 1, wherein a molar fraction of the $M_1$ is within a range of 3.35 to 3.4 in the case where a total of a molar fraction of the $M_2$ is regarded as 1.

6. A sulfide solid electrolyte material having an octahedron O composed of an $M_1$ element and a S element, a tetrahedron $T_1$ composed of an $M_{2a}$ element and a S element, and a tetrahedron $T_2$ composed of an $M_{2b}$ element and a S element, and that the tetrahedron $T_1$ and the octahedron O share an edge, the tetrahedron $T_2$ and the octahedron O contain a crystal structure sharing a corner as a main body;
the $M_1$ comprises at least Li;
at least one of the $M_{2a}$ and the $M_{2b}$ comprises P;
at least one of the $M_{2a}$ and the $M_{2b}$ comprises Si;
at least one of the $M_{2a}$ and the $M_{2b}$ comprises an element other than P and Si; and
the other element is at least one selected from the group consisting of Sn, Ti, Zr, and Nb,
wherein the sulfide solid electrolyte material is represented by $Li_{(4-x)}(M_{2x(1-\delta)}Si_\delta)_{(1-x)}P_x(S_{1-y}O_y)_4$ ($M_{2x}$ is at least one kind selected from the group consisting of Sn, Zr, Ti and Nb, $0<x<1$, $0\leq y\leq 0.25$, $0<\delta<1$).

7. The sulfide solid electrolyte material according to claim 6, wherein a molar fraction of Si to the $M_{2a}$ and the $M_{2b}$ which are excluding P is 30% or more.

8. The sulfide solid electrolyte material according to claim 6, wherein an a-axial length of a lattice constant is within a range of 8.66 A to 8.69 A in the crystal structure.

9. The sulfide solid electrolyte material according to claim 6, wherein a molar fraction of the $M_1$ is within a range of 3.35 to 3.4 in the case where a total of a molar fraction of the $M_{2a}$ and the $M_{2b}$ is regarded as 1.

10. A lithium battery comprising a cathode active material layer containing a cathode active material, an anode active material layer containing an anode active material, and an electrolyte layer formed between the cathode active material layer and the anode active material layer;
wherein at least one of the cathode active material layer, the anode active material layer and the electrolyte layer contains the sulfide solid electrolyte material according to claim 1.

11. A lithium battery comprising a cathode active material layer containing a cathode active material, an anode active material layer containing an anode active material, and an electrolyte layer formed between the cathode active material layer and the anode active material layer;
wherein at least one of the cathode active material layer, the anode active material layer and the electrolyte layer contains the sulfide solid electrolyte material according to claim 6.

12. A producing method for a sulfide solid electrolyte material, the sulfide solid electrolyte material being the sulfide solid electrolyte material according to claim 1, comprising steps of:
an ion conductive material synthesizing step of synthesizing an amorphized ion conductive material by mechanical milling while using a raw material composition containing the $M_1$ element, the $M_2$ element and the S element, and
a heating step of obtaining the sulfide solid electrolyte material by heating the amorphized ion conductive material.

13. A producing method for a sulfide solid electrolyte material, the sulfide solid electrolyte material being the sulfide solid electrolyte material according to claim 6, comprising steps of:
an ion conductive material synthesizing step of synthesizing an amorphized ion conductive material by mechanical milling while using a raw material composition containing the $M_1$ element, the $M_{2a}$ element, the $M_{2b}$ element and the S element, and
a heating step of obtaining the sulfide solid electrolyte material by heating the amorphized ion conductive material.

14. The sulfide solid electrolyte material according to claim 2, wherein a molar fraction of Si to the $M_2$ element excluding P is 30% or more.

15. The sulfide solid electrolyte material according to claim 2, wherein an a-axial length of a lattice constant is within a range of 8.66 A to 8.69 A in a crystal phase having a peak at the position of $2\theta=29.58°\pm 0.50°$.

16. The sulfide solid electrolyte material according to claim 2, wherein a molar fraction of the $M_1$ is within a range of 3.35 to 3.4 in the case where a total of a molar fraction of the $M_2$ is regarded as 1.

17. A lithium battery comprising a cathode active material layer containing a cathode active material, an anode active material layer containing an anode active material, and an electrolyte layer formed between the cathode active material layer and the anode active material layer;
wherein at least one of the cathode active material layer, the anode active material layer and the electrolyte layer contains the sulfide solid electrolyte material according to claim 2.

18. A producing method for a sulfide solid electrolyte material, the sulfide solid electrolyte material being the sulfide solid electrolyte material according to claim 2, comprising steps of:

an ion conductive material synthesizing step of synthesizing an amorphized ion conductive material by mechanical milling while using a raw material composition containing the $M_1$ element, the $M_{2a}$ element, the $M_{2b}$ element and the S element, and a heating step of obtaining the sulfide solid electrolyte material by heating the amorphized ion conductive material.

* * * * *